US012803270B2

(12) United States Patent
Pan et al.

(10) Patent No.: US 12,803,270 B2
(45) Date of Patent: Nov. 17, 2026

(54) PHOTOVOLTAIC POWER GENERATION SYSTEM AND FAULT PROTECTION METHOD AND DEVICE THEREOF, COMBINER BOX, AND INVERTER

(71) Applicant: SUNGROW POWER SUPPLY CO., LTD., Hefei (CN)

(72) Inventors: Nianan Pan, Hefei (CN); Bing Zhang, Hefei (CN); Jigui Feng, Hefei (CN); Jie Ding, Hefei (CN); Xianli Zhang, Hefei (CN)

(73) Assignee: SUNGROW POWER SUPPLY CO., LTD., Hefei (CN)

( * ) Notice: Subject to any disclaimer, the term of this patent is extended or adjusted under 35 U.S.C. 154(b) by 176 days.

(21) Appl. No.: 18/783,432

(22) Filed: Jul. 25, 2024

(65) Prior Publication Data

US 2024/0396323 A1 Nov. 28, 2024

Related U.S. Application Data

(63) Continuation of application No. PCT/CN2023/134467, filed on Nov. 27, 2023.

(30) Foreign Application Priority Data

May 26, 2023 (CN) ......................... 202310604548.6

(51) Int. Cl.
*H02H 7/20* (2006.01)
*H02J 3/38* (2026.01)
(Continued)

(52) U.S. Cl.
CPC ............... *H02H 7/20* (2013.01); *H02J 3/381* (2013.01); *H02S 40/32* (2014.12); *H02S 50/10* (2014.12); *H02J 2101/24* (2026.01)

(58) Field of Classification Search
CPC .......... H02H 3/087; H02H 7/20; H02H 7/268; H02H 11/002; H02J 1/14; H02J 3/001;
(Continued)

(56) References Cited

U.S. PATENT DOCUMENTS

2013/0285670 A1 10/2013 Yoshidomi et al.
2015/0188487 A1 7/2015 Yoshidomi et al.
2015/0288188 A1 10/2015 Keshner et al.

FOREIGN PATENT DOCUMENTS

CN 109510450 A * 3/2019 ............. H02J 3/383
CN 112134305 A 12/2020
(Continued)

OTHER PUBLICATIONS

Machine translation of Pan et al. Chinese Patent Document CN 109510450 A Mar. 2019 (Year: 2019).*
(Continued)

*Primary Examiner* — Kevin J Comber

(57) ABSTRACT

Provided are a photovoltaic power generation system and a fault protection method and device thereof, a combiner box, and an inverter, which relate to the technical field of photovoltaic power generation. The system includes a power conversion unit, a multi-pole linked switch, and N photovoltaic strings. The method includes: controlling, in response to a fault in the photovoltaic power generation system, a switch tube in the power conversion unit to short-circuit the positive input terminal and the negative input terminal of the power conversion unit, and controlling the multi-pole linked switch to be disconnected, such that at most three of the N photovoltaic strings are connected in parallel.

26 Claims, 14 Drawing Sheets

(51) Int. Cl.

| | |
|---|---|
| ***H02S 40/32*** | (2014.01) |
| ***H02S 50/10*** | (2014.01) |
| *H02J 101/24* | (2026.01) |

(58) Field of Classification Search

CPC ....... H02J 3/381; H02J 2101/24; H02S 40/32; H02S 40/34; H02S 50/00; H02S 50/10; H10F 77/955; Y02E 10/50

USPC ............................................................ 361/42

See application file for complete search history.

(56) References Cited

FOREIGN PATENT DOCUMENTS

| | | | | | |
|---|---|---|---|---|---|
| CN | 112505518 A | | 3/2021 | | |
| CN | 113595393 A | | 11/2021 | | |
| CN | 113725847 A | * | 11/2021 | ............... | H02H 7/20 |
| CN | 114583699 A | | 6/2022 | | |
| CN | 217216075 U | | 8/2022 | | |
| CN | 218783786 U | | 3/2023 | | |
| CN | 116388131 A | | 7/2023 | | |
| WO | 2022052646 A1 | | 3/2022 | | |
| WO | 2022174402 A1 | | 8/2022 | | |

OTHER PUBLICATIONS

Machine translation of Zhang et al. Chinese Patent Document CN 113725847 A Nov. 2021 (Year: 2021).*

Extended European Search Report dated Jul. 22, 2025 received in corresponding European Application No. EP23858393.4.

International Search Report dated Feb. 21, 2024 in International Application No. PCT/CN2023/134467. English translation attached.

The Grant Notice from corresponding Chinese Application No. 202310604548.6, dated Jul. 11, 2023. English translation attached.

* cited by examiner

PHOTOVOLTAIC POWER GENERATION SYSTEM AND FAULT PROTECTION METHOD AND DEVICE THEREOF, COMBINER BOX, AND INVERTER

CROSS-REFERENCE TO RELATED APPLICATIONS

This application is a continuation of International Application No. PCT/CN2023/134467, filed on Nov. 27, 2023, which claims priorities to Chinese Patent Application No. 202310604548.6 filed on May 26, 2023 and entitled "PHOTOVOLTAIC POWER GENERATION SYSTEM AND FAULT PROTECTION METHOD AND DEVICE THEREOF, COMBINER BOX, AND INVERTER", both of which are hereby incorporated by reference in its entirety.

FIELD

The present disclosure relates to the technical field of photovoltaic power generation, and more particularly, to a photovoltaic power generation system and a fault protection method and device thereof, a combiner box, and an inverter.

BACKGROUND

In a photovoltaic power generation system, a plurality of photovoltaic strings are connected to a power conversion unit through a fault isolation circuit, so as to provide generated power to the power conversion unit through the fault isolation circuit. The fault isolation circuit uses a direct-current switch with a disconnection function. When a fault occurs in the photovoltaic power generation system, such as faults like a short circuit or a reverse connection occurring in the photovoltaic string and faults occurring inside the power conversion unit, fault isolation between the photovoltaic string and the power conversion unit is realized by controlling disconnection of the direct-current switch.

However, when a short-circuit fault or a reverse connection fault occurs in the photovoltaic string, a short-circuit current or a reverse connection current of a branch where the corresponding direct-current switch is located is large, and the direct-current switch is disconnected under a large short-circuit current or a large reverse connection current, so that a certain potential safety hazard exists.

SUMMARY

The present disclosure aims to solve at least one of the technical problems in the related art to some extent. To this end, an objective of the present disclosure is to provide a photovoltaic power generation system and a fault protection method and device thereof, a combiner box, and an inverter. When a fault occurs in the system, a positive input terminal and a negative input terminal of the power conversion unit are short-circuited, which can improve safety of a multi-pole linked switch during disconnection, enabling the multi-pole linked switch to disconnect and isolate the fault more safely and reliably; and after the multi-pole linked switch is disconnected, there are at most three photovoltaic strings in N photovoltaic strings connected in parallel, such that safety of the photovoltaic string can be improved.

In a first aspect, an embodiment of the present disclosure provides a fault protection method for a photovoltaic power generation system. The photovoltaic power generation system includes a power conversion unit, a multi-pole linked switch, N photovoltaic strings, and positive connection terminals and negative connection terminals that are adapted to connect the N photovoltaic strings. Each pole switch in the multi-pole linked switch has a first terminal connected to one of the positive connection terminals or the negative connection terminals and a second terminal adapted to be connected to a positive input terminal or a negative input terminal of the power conversion unit, where N is an integer greater than or equal to 3. The fault protection method includes: controlling, in response to a fault in the photovoltaic power generation system, a switch tube in the power conversion unit to short-circuit the positive input terminal and the negative input terminal of the power conversion unit, and controlling the multi-pole linked switch to be disconnected, such that at most three of the N photovoltaic strings are connected in parallel.

In a second aspect, an embodiment of the present disclosure provides a fault protection device for a photovoltaic power generation system. The photovoltaic power generation system further includes a power conversion unit and N photovoltaic strings, where N is an integer greater than or equal to 3. The fault protection device includes: positive connection terminals and negative connection terminals, a multi-pole linked switch, and a control portion. The positive connection terminals and the negative connection terminals are adapted to connect to the N photovoltaic strings. Each pole switch in the multi-pole linked switch has a first terminal connected to one of the positive connection terminals or the negative connection terminals and a second terminal adapted to be connected to a positive input terminal or a negative input terminal of the power conversion unit. The control portion is configured to control, in response to detecting a fault in the photovoltaic power generation system, a switch tube in the power conversion unit to short-circuit a positive input terminal and a negative input terminal of the power conversion unit to control the multi-pole linked switch to be disconnected, such that at most three of the N photovoltaic strings are connected in parallel.

In a third aspect, an embodiment of the present disclosure provides a combiner box including the fault protection device as described above. The fault protection device is configured to, in response to a fault in the photovoltaic power generation system, short-circuit a positive input terminal and a negative input terminal of a power conversion unit and disconnect N photovoltaic strings and the power conversion unit, such that at most three of the N photovoltaic strings are connected in parallel.

In a fourth aspect, an embodiment of the present disclosure provides an inverter, including the fault protection device as described above and a power conversion unit. The power conversion unit includes a DC/AC converter. The power conversion unit is configured to convert a direct-current outputted by the N photovoltaic strings and output an alternating current through the DC/AC converter. The fault protection device is configured to, in response to a fault in the photovoltaic power generation system, short-circuit a positive input terminal and a negative input terminal of the power conversion unit and disconnect the N photovoltaic strings and the power conversion unit, such that at most three of the N photovoltaic strings are connected in parallel.

In a fifth aspect, an embodiment of the present disclosure provides a photovoltaic power generation system, including the fault protection device as described above Additional aspects and advantages of the present disclosure is provided in part in the following description, or becomes apparent in part from the following description, or can be learned from practicing of the present disclosure.

DETAILED DESCRIPTION

Figure 1:
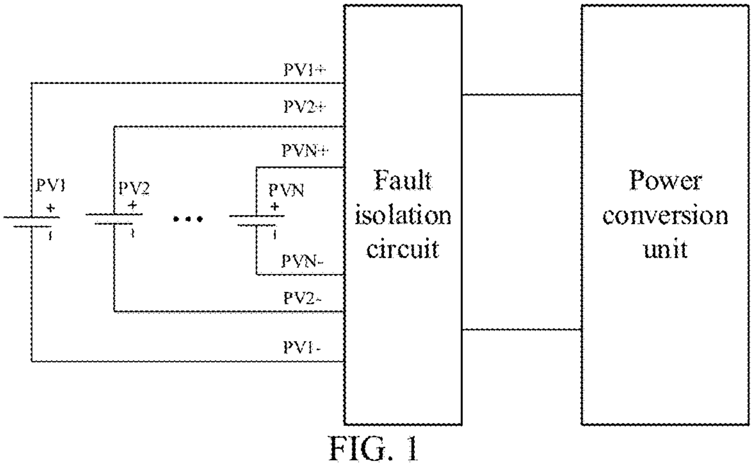
FIG. 1 is a schematic structural diagram of a photovoltaic power generation system in the related art.

The embodiments of the present disclosure are described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limiting, the present disclosure.

Referring to FIG. 1, in a photovoltaic power generation system, N photovoltaic strings PV1, PV2, . . . , PVN are connected to a power conversion unit through a fault isolation circuit, to provide the generated power to the power conversion unit through the fault isolation circuit. The fault isolation circuit uses a direct-current switch with a disconnection function. The direct-current switch can be controlled to be disconnected manually or controlled to be disconnected through a control portion in the system.

When a fault occurs in the photovoltaic power generation system, for example, the fault like a short circuit or a reverse connection occurs in the photovoltaic string, the fault occurs inside the power conversion unit, and the like. Disconnection of the direct-current switch may be manually controlled or automatically controlled by the control portion. In this way, it is realized that the photovoltaic string is allowed to be isolated from the DC-DC converter and the DC-AC converter.

However, when a short-circuit fault or a reverse connection fault occurs in the photovoltaic string, a short-circuit current or a reverse connection current of a branch where the corresponding direct-current switch is located is large. In this way, the direct-current switch is disconnected under a large short-circuit current or a large reverse connection current, so that potential safety hazards exist.

Based on this, the embodiments of the present disclosure provide a photovoltaic power generation system, a fault protection method and device therefor, a combiner box, and an inverter. When a fault occurs in a system, for example, a short-circuit fault or a reverse connection fault occurs in the photovoltaic string, by short-circuiting a positive input terminal and a negative input terminal of the power conversion unit, safety of the multi-pole linked switch during disconnection can be improved, such that the multi-pole linked switch can disconnect and isolate the fault more safely and reliably; and after the multi-pole linked switch is disconnected, there are at most three of N photovoltaic strings connected in parallel, which can improve safety of the photovoltaic string.

In order to enable a person skilled in the art to better understand the technical solutions of the present disclosure, the technical solutions in the embodiments of the present disclosure are clearly described below in conjunction with the accompanying drawings in the embodiments of the present disclosure.

The photovoltaic power generation system provided in this embodiment of the present disclosure may include a power conversion unit and N photovoltaic strings. The fault protection device may include: X positive connection terminals and Y negative connection terminals that are adapted to connect the N photovoltaic strings, a multi-pole linked switch, and a control portion. Each pole switch in the multi-pole linked switch has a first terminal connected to one of the X positive connection terminals and the Y negative connection terminals. Each of pole switches connected to the positive connection terminals has a second terminal adapted to be connected to a positive input terminal of the power conversion unit. Each of pole switches connected to the negative connection terminals has a second terminal adapted to be connected to a negative input terminal of the power conversion unit. N is an integer greater than or equal to 3, and 2≤X≤N and 2≤Y≤N. When one of X and Y is equal to N, X is unequal to Y. The control portion is configured to control, in response to detecting a fault in the photovoltaic power generation system, a switch tube in the power conversion unit to short-circuit a positive input terminal and a negative input terminal of the power conversion unit to control the multi-pole linked switch to be disconnected, such that at most three of the N photovoltaic strings are connected in parallel.

It should be noted that, the power conversion unit refers to a device capable of converting power generated by the photovoltaic string unit into required power for a user. For example, when the photovoltaic power generation system is connected to the grid, the power conversion unit may convert a direct current transmitted by the photovoltaic string into alternating current mains to be incorporated into the power grid. When the photovoltaic power generation system directly supplies power to an alternating load, the power conversion unit can convert the direct current transmitted by the photovoltaic string into an alternating current required by an alternating load to be supplied to the alternating load. When the photovoltaic power generation system directly supplies power to the direct-current load, the power conversion unit can convert the direct current transmitted by the photovoltaic string into the direct current required by the direct-current load to be supplied to the direct-current load. A structure of the power conversion unit is not limited herein. For example, as required, the power conversion unit may be, but is not limited to, a DC/DC converter and a DC/AC converter. The DC refers to a direct current. The AC refers to an alternating current. The DC/DC converter refers to a direct-current-direct-current converter. The DC/AC converter refers to a direct-current-alternating-current converter.

The multi-pole linked switch refers to a switch that includes a plurality of pole switches capable of being linked. For example, the plurality of pole switches can be connected to disconnected simultaneously. The pole switch comprises a positive switch and a negative switch. The positive switch refers to a switch connected to a positive electrode of the photovoltaic string, and the negative switch refers to a switch connected to a negative electrode of the photovoltaic string. Structures, models, and the like of the positive switch and the negative switch may be the same or different, i.e., the switch itself may not be distinguished, which may each be, but is not limited to, a direct-current circuit breaker, and the like.

The photovoltaic string may be formed by a series-parallel connection of a plurality of photovoltaic modules. For example, the plurality of photovoltaic modules are directly connected in series, or the plurality of photovoltaic modules are connected in parallel and then connected in series to form the photovoltaic string. A specific number, parameter, and the like of the photovoltaic modules included in the specific photovoltaic string are not limited herein. In an embodiment of the present disclosure, the photovoltaic power generation system includes N photovoltaic strings, where N is an integer greater than or equal to 3. It can be understood that when N=1 or N=2, even if a short-circuit fault or a reverse connection fault occurs in the photovoltaic string, since a current flowing through the multi-pole linked switch is not increased during short-circuit or reverse connection, a potential safety hazard is small when the multi-pole linked switch is disconnected. At this time, the positive input terminal and the negative input terminal of the power conversion unit may not be short-circuited, to reduce the current flowing through the multi-pole linked switch. Therefore, in the embodiments of the present disclosure, a number of photovoltaic strings is an integer greater than or equal to 3.

The N photovoltaic strings may be connected to the multi-pole linked switch through the X positive connection terminals and the Y negative connection terminals. A total number of the pole switches of the multi-pole linked switch is the same as a total number of the positive connection terminals and the negative connection terminals. A number of the positive switches is the same as the number of positive connection terminals. A number of the negative switches is the same as the number of negative connection terminals. That is, the N photovoltaic strings can be connected to the first terminals of the X positive switches through the X positive connection terminals and connected to the first terminals of the Y negative switches through the Y negative connection terminals. The second terminals of the X positive switches are also connected to the positive input terminal of the power conversion unit, and the second terminals of the Y negative switches are also connected to the negative input terminal of the power conversion unit, where 2≤X≤N, and 2≤Y≤N. When one of X and Y is equal to N, X is unequal to Y, i.e., each of the positive connection terminals and the negative connection terminals has a maximum number not exceeding the number of photovoltaic strings and a minimum number higher than or equal to two. Moreover, when one of the number of positive connection terminals and the number of negative connection terminals is the number of photovoltaic strings, the number of positive connection terminals is different from the number of negative connection terminals. In this way, a number of pole switches can be reduced to some extent.

Further, after the multi-pole linked switch is disconnected, at most three of the N photovoltaic strings are connected in parallel. Therefore, when X and Y meet the above conditions, there is also a need to cause a parallel connection to occur between at most three of the N photovoltaic strings after the multi-pole linked switch 20 is disconnected.

Exemplarily, in case 1, the photovoltaic power generation system is explained by taking N=3 as an example.

When N=3, there are many possibilities for the number of positive connection terminals and the number of negative connection terminals. For example, when X=3, Y=2; or when X=2, Y=2 or 3. At this time, X and Y satisfy: 2≤X≤N, 2≤Y≤N, and when one of X and Y is equal to N, X is unequal to Y. Meanwhile, there are at most two photovoltaic strings connected to each connection terminal. Therefore, it can be satisfied that after the multi-pole linked switch 20 is disconnected, there are at most three of the N photovoltaic strings connected in parallel.

Figure 2A:
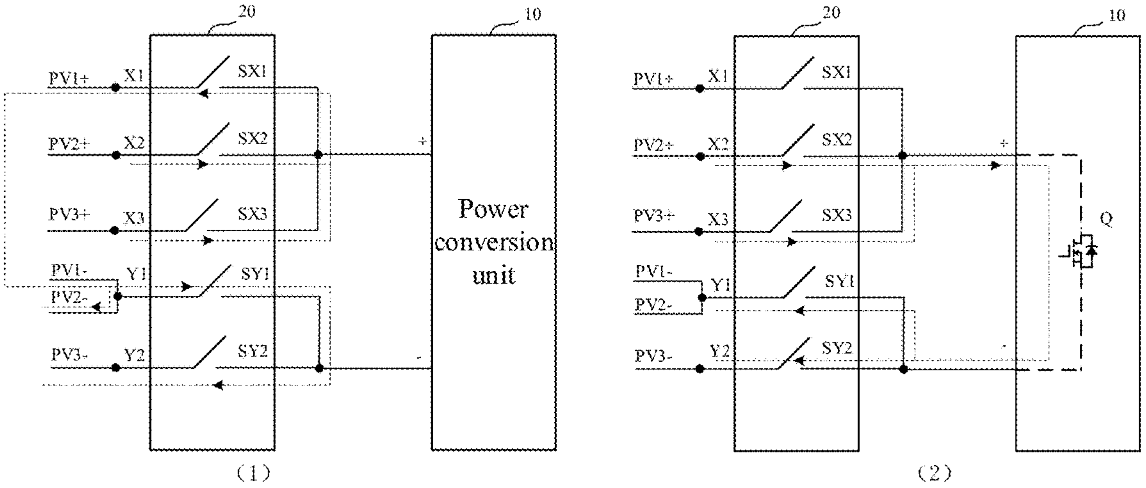
FIG. 2*a* and FIG. 2*b* are schematic structural diagrams of a photovoltaic power generation system having three photovoltaic strings according to an embodiment of the present disclosure.

For example, when X=3 and Y=2, referring to FIG. 2*a*, the photovoltaic power generation system includes three photovoltaic strings PV1, PV2, and PV3, and the power conversion unit 10. The fault protection device includes three positive connection terminals X1, X2, and X3, two negative connection terminals Y1 and Y2, a multi-pole linked switch 20, and a control portion (not shown). The multi-pole linked switch 20 includes three positive switches SX1, SX2, and SX3 and two negative switches SY1 and SY2. A positive electrode PV1+ of the photovoltaic string PV1 is connected to a first terminal of the positive switch SX1 through the positive connection terminal X1, a positive electrode PV2+ of the photovoltaic string PV2 is connected to a first terminal of the positive switch SX2 through the positive connection terminal X2, and a positive electrode PV3+ of the photovoltaic string PV3 is connected to a first terminal of the positive switch SX3 through the positive connection terminal X3. Each of a negative electrode PV1− of the photovoltaic string PV1 and a negative electrode PV2− of the photovoltaic string PV2 is connected to a first terminal of the negative switch SY1 through the negative connection terminal Y1, and a negative electrode PV3− of the photovoltaic string PV3 is connected to a first terminal of the negative switch SY2 through the negative connection terminal Y2. Each of second terminals of the positive electrode switches SX1, SX2, and SX3 is connected to the positive input terminal of the power conversion unit 10, and each of second terminals of the negative electrode switches SY1 and SY2 is connected to the negative input terminal of the power conversion unit 10.

It should be noted that FIG. 2*a* is merely an exemplary description. In this case, other connection modes may also be used. For example, PV1− and PV3− are connected to the first terminal of SY1 through Y1, or PV2− and PV3− are connected to the first terminal of SY1 through Y1, etc., which is not described again herein.

Figure 2B:
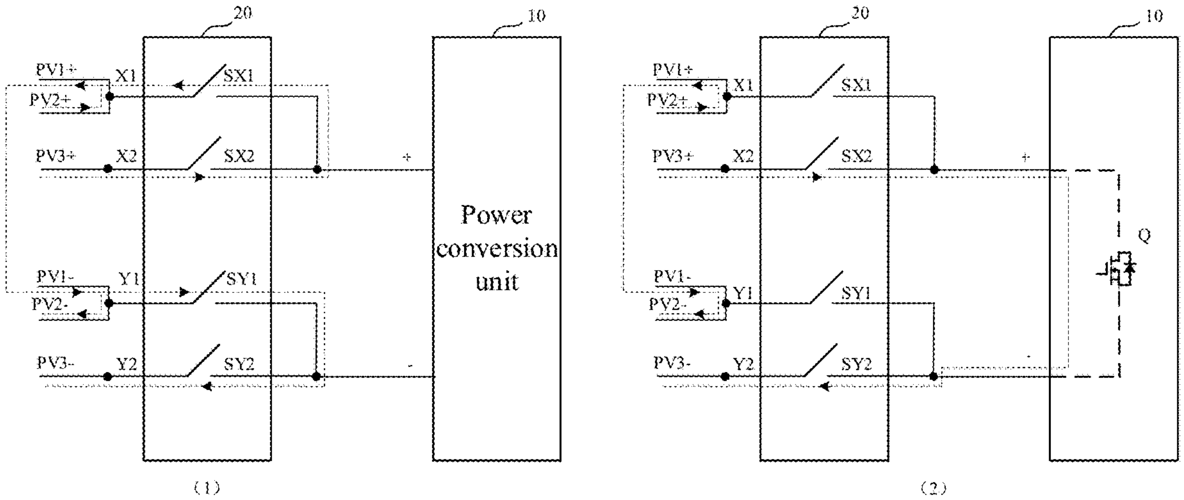

For another example, when X=2 and Y=2, referring to FIG. 2*b*, the photovoltaic power generation system includes: three photovoltaic strings PV1, PV2, and PV3, and the power conversion unit 10. The fault protection device includes two positive connection terminals X1 and X2, two negative connection terminals Y1 and Y2, a multi-pole linked switch 20, and a control portion (not shown). The multi-pole linked switch 20 includes two positive switches SX1 and SX2 and two negative switches SY1 and SY2. Each of the positive electrode PV1+ of the photovoltaic string PV1 and the positive electrode PV2+ of the photovoltaic string PV2 is connected to the first terminal of the positive switch SX1 through the positive connection terminal X1, and the positive electrode PV3+ of the photovoltaic string PV3 is connected to the first terminal of the positive switch SX2 through the positive connection terminal X2. Each of the negative electrode PV1− of the photovoltaic string PV1 and the negative electrode PV2− of the photovoltaic string PV2 is connected to the first terminal of the negative switch SY1 through the negative connection terminal Y1, and the negative electrode PV3− of the photovoltaic string PV3 is connected to the first terminal of the negative switch SY2 through the negative connection terminal Y2. Each of the second terminals of the positive electrode switches SX1 and SX2 is connected to the positive input terminal of the power conversion unit 10, and each of the second terminals of the negative electrode switches SY1 and SY2 is connected to the negative input terminal of the power conversion unit 10.

It should be noted that FIG. 2*b* is merely an exemplary description. In this case, other connection modes may also be used. For example, PV1+ and PV3+ are connected to the first terminal of SX1 through X1, or PV2+ and PV3+ are connected to the first terminal of SX1 through X1, etc., which is not described again herein.

When X=2 and Y=3, the structure of the system is symmetrical to the structure illustrated in FIG. 2*a*, and its details will not be described herein.

In case 2, the photovoltaic power generation system is explained by taking N=4 as an example.

When N=4, there are many possibilities for the number of positive connection terminals and the number of negative connection terminals. For example, when X=4, Y=3 or 2; and when X=3 or 2, Y=2, 3, or 4. At this time, X and Y satisfy: 2≤X≤N, 2≤Y≤N, and when one of X and Y is equal to N, X is unequal to Y. Meanwhile, there are at most three photovoltaic strings connected to each connection terminal. In this way, it can be satisfied that there are at most three of the N photovoltaic strings connected in parallel after the multi-pole linked switch 20 is disconnected.

In this case, there are many situations in the structure of the photovoltaic power generation system. Therefore, in order to avoid repetition, the structure of the system is no longer described herein, and exemplary descriptions are performed only by using the examples illustrated in FIG. 3*a* and FIG. 3*b*.

In case 3, the photovoltaic power generation system is explained by taking N=5 as an example.

When N=5, there are many possibilities for the number of positive connection terminals and the number of negative connection terminals. For example, when X=5, Y=4, 3, or 2; and when X=4, 3 or 2, Y=5, 4, 3, or 2, and when X=2 and Y=2, it can be satisfied that there are at most three of the N photovoltaic strings connected in parallel by reasonably providing the connection relationship after the multi-pole linked switch 20 is disconnected. For example, when a same positive connection terminal is connected to positive electrodes of the four photovoltaic strings, the negative electrodes of the four photovoltaic strings are connected by two negative connection terminals. For another example, a same positive connection terminal is connected to positive electrodes of at most three photovoltaic strings, and the same negative connection terminal is connected to negative electrodes of at most three photovoltaic strings. At this time, X and Y satisfy: 2≤X≤N, 2≤Y≤N, and when one of X and Y is equal to N, X is unequal to Y. Meanwhile, it can be satisfied that there are at most three of the N photovoltaic strings connected in parallel after the multi-pole linked switch 20 is disconnected.

In this case, there are many situations in the structure of the photovoltaic power generation system. Therefore, in order to avoid repetition, the structure of the system is no longer described herein, and exemplary descriptions are performed only by using the examples illustrated in FIG. 4*a* and FIG. 4*b*.

In case 4, the photovoltaic power generation system is explained by taking N=6 as an example.

When N=6, there are many possibilities for the number of positive connection terminals and the number of negative connection terminals. For example, when X=6, Y=5, 4, 3, or 2; and when X=5, 4, 3 or 2, Y=6, 5, 4, 3, or 2, and when X=3 and Y=3 or 2, or X=2 and Y=3 or 2, it can be satisfied that there are at most three of the N photovoltaic strings connected in parallel by reasonably providing the connection relationship after the multi-pole linked switch 20 is disconnected. For example, when the same positive connection terminal is connected to the positive electrodes of the four photovoltaic strings, the negative electrodes of the four photovoltaic strings are connected by at least two negative connection terminals. For another example, the same positive connection terminal is connected to the positive electrodes of at most three photovoltaic strings, and the same negative connection terminal is connected to the negative electrodes of at most three photovoltaic strings. It should be noted that, provided is merely an exemplary description herein. For other cases, there is no further description herein. At this time, X and Y satisfy: 2≤X≤N, 2≤Y≤N. When one of X and Y is equal to N, X is unequal to Y. Meanwhile, it can be satisfied that there are at most three of the N photovoltaic strings connected in parallel after the multi-pole linked switch 20 is disconnected.

In this case, there are many situations in the structure of the photovoltaic power generation system. Therefore, in order to avoid repetition, the structure of the system is no longer described herein, and exemplary descriptions are performed only by using the example illustrated in FIG. 5.

In case 5, the photovoltaic power generation system is explained by taking N=7 as an example.

When N=7, there are many possibilities for the number of positive connection terminals and the number of negative connection terminals. For example, when X=7, Y=6, 5, 4, 3, or 2; and when X=6, 5, 4, 3 or 2, Y=7, 6, 5, 4, 3 or 2, and when X=4 and Y=4, 3 or 2, or when X=2 and Y=4, 3 or 2, or when X=4 and Y=4, 3 or 2, it can be satisfied that there are at most three of the N photovoltaic strings connected in parallel by reasonably providing the connection relationship after the multi-pole linked switch 20 is disconnected. For example, when X=4 and Y=4, and when the same positive connection terminal is connected to the positive electrodes of the four photovoltaic strings, the negative electrodes of the four photovoltaic strings are connected by the at least two negative connection terminals. For another example, the same positive connection terminal is connected to the positive electrodes of at most three photovoltaic strings, and the same negative connection terminal is connected to the negative electrodes of at most three photovoltaic strings. It should be noted that, provided is merely an exemplary description herein. For other cases, there is no further description herein. At this time, X and Y satisfy: 2≤X≤N, 2≤Y≤N, and when one of X and Y is equal to N, X is unequal to Y. Meanwhile, it can be satisfied that there are at most three of the N photovoltaic strings connected in parallel after the multi-pole linked switch 20 is disconnected.

In this case, there are many situations in the structure of the photovoltaic power generation system. Therefore, in order to avoid repetition, the structure of the system is no longer described herein, and exemplary descriptions are performed only by using the example illustrated in FIG. 6.

In case 6, the photovoltaic power generation system is explained by taking N=8 as an example.

When N=8, there are many possibilities for the number of positive connection terminals and the number of negative connection terminals. For example, when X=8, Y=7, 6, 5, 4, 3, or 2; when X=7, 6, 5, 4 or 3, Y=8, 7, 6, 5, 4, 3 or 2; and when X=2, Y=8, 7, 6, 5, 4, or 3, and when X=5 and Y=5, 4, 3 or 2, or when X=4 and Y=5, 4, 3 or 2, or when X=3 and Y=5, 4, 3 or 2, or when X=3 and Y=5, 4, or 3, it can be satisfied that there are at most three of the N photovoltaic strings connected in parallel by reasonably providing the connection relationship after the multi-pole linked switch 20 is disconnected. For example, when X=5 and Y=5, and when the same positive connection terminal is connected to the positive electrodes of the four photovoltaic strings, the negative electrodes of the four photovoltaic strings are connected by the at least two negative connection terminals. It should be noted that, provided is merely an exemplary description herein. For other cases, there is no further description herein. At this time, X and Y satisfy: 2≤X≤N, 2≤Y≤N, and when one of X and Y is equal to N, X is unequal to Y. Meanwhile, it can be satisfied that there are at most three of the N photovoltaic strings connected in parallel after the multi-pole linked switch 20 is disconnected.

In this case, there are many situations in the structure of the photovoltaic power generation system. Therefore, in order to avoid repetition, the structure of the system is no longer described herein, and exemplary descriptions are performed only by using the example illustrated in FIG. 7.

It should be noted that, for other unlisted cases, reference can be made to the foregoing, and its details will not be described herein.

The protection principle of the fault protection device is explained below in conjunction with the foregoing cases 1 to 6.

For case 1: for example, with reference to FIG. 2*a*, in a case where the photovoltaic power generation system is normal, the photovoltaic strings PV1, PV2, and PV3 supply the generated power to the power conversion unit 10 through the multi-pole linked switch 20. In the case where the fault occurs in the photovoltaic power generation system, for example, the photovoltaic string PV1 is short-circuited or reversely connected, with reference to FIG. 2*a* (1), during short-circuit, a current of the photovoltaic string PV2 and a current of the photovoltaic string PV3 flow into the photovoltaic string PV1. If the multi-pole linked switch 20 is directly disconnected at this time, the positive switch SX1 corresponding to the photovoltaic string PV1 needs to be disconnected when subjected to two times a short-circuit current of a single photovoltaic string, i.e., a sum of the current of the photovoltaic string PV2 and the current of the photovoltaic string PV3, and the negative switch SY1 corresponding to the photovoltaic string PV1 needs to be disconnected when subjected to one time the short-circuit current of a single photovoltaic string, i.e., the current of the photovoltaic string PV3. At this time, the multi-pole linked switch 20 needs to be disconnected when subjected to at most two times a disconnection current of a single photovoltaic string. During reverse connection, i.e., positions of the positive electrode PV1+ and the negative electrode PV1− of the photovoltaic string PV1 are interchanged. Since an anti-parallel-connection diode occurs inside a photovoltaic module, the current of the photovoltaic string PV2 and the current of the photovoltaic string PV3 are caused reversely poured to the photovoltaic string PV1. If the multi-pole linked switch 20 is directly disconnected at this time, the positive switch SX1 corresponding to the photovoltaic string PV1 needs to be disconnected when subjected to two times a reverse connection current of a single photovoltaic string, i.e., the sum of the current of the photovoltaic string PV2 and the current of the photovoltaic string PV3, and the negative switch SY1 corresponding to the photovoltaic string PV1 needs to be disconnected when subjected to one time the short-circuit current of a single photovoltaic string, i.e., the current of the photovoltaic string PV3. At this time, the multi-pole linked switch 20 needs to be disconnected when subjected to at most two times the disconnection current of a single photovoltaic string, and at the same time, also needs to be disconnected when subjected to two times a disconnection voltage of a single photovoltaic string.

According to FIG. 2*a* (2), when a switch tube Q in the power conversion unit is controlled by the control portion to short-circuit the positive input terminal and the negative input terminal of the power conversion unit 10, i.e., a new short-circuit channel or a new reverse connection channel is formed inside the power conversion unit 10. Since impedance of the switch tube Q in the channel is smaller than impedance of the photovoltaic string, most of short-circuit currents or reverse connection currents pass through the channel, thereby effectively lowering a current flowing through the positive switch SX1 corresponding to the photovoltaic string PV1 and lowering a short-circuit current or reverse connection current and a disconnection voltage flowing through the positive switch SX1 corresponding to a faulty photovoltaic string PV1. At this time, a maximum disconnection current of the multi-pole linked switch 20 is one time the disconnection current of a single photovoltaic string. Moreover, a maximum disconnection voltage of the multi-pole linked switch 20 during reverse connection is one time the disconnection voltage of a single photovoltaic string. Compared with two times the disconnection current of a single photovoltaic string and two times the disconnection voltage of a single photovoltaic string, the maximum disconnection current and the maximum disconnection voltage of the multi-pole linked switch 20 are effectively reduced. Further, the positive switch SX1 is enabled to be disconnected more safely and reliably, so that the multi-pole linked switch 20 can disconnect and isolate the fault more safely and reliably. The switch tube Q is generally a semiconductor device, including, but not limited to, an IGBT, a MOSFET, or the like.

When or after the switch tube Q in the power conversion unit 10 is controlled by the control portion to short-circuit the positive input terminal and the negative input terminal of the power conversion unit 10, the multi-pole linked switch 20 can be controlled by the control portion to be disconnected, enabling a parallel connection to occur in at most three of the N photovoltaic strings. In this way, in response to one photovoltaic string being able to bear a current outputted by at most two photovoltaic strings, when the fault occurs in the photovoltaic string, at most two normal photovoltaic strings output current to the faulty photovoltaic string. At this time, the current is within a range that the faulty photovoltaic string can bear, thereby protecting the photovoltaic string from being damaged. For example, in the example illustrated in FIG. 2*a*, after the multi-pole linked switch 20 is disconnected, no parallel connection occurs in the photovoltaic string. Therefore, the photovoltaic string cannot be damaged.

It should be noted that the protection principle when the photovoltaic string PV2 is short-circuited or reversely connected is the same as the protection principle when the photovoltaic string PV1 is short-circuited or reversely connected. In order to avoid repetition, its details will not be described herein.

When the photovoltaic string PV3 is short-circuited or reversely connected, it can be seen from the principle described above that a current flowing through the positive switch SX3 and the negative switch SY2 corresponding to the photovoltaic string PV3 can be effectively reduced. Although the maximum disconnection current of the multi-pole linked switch 20 is not changed, the short-circuit current or the reverse connection current and the disconnection voltage flowing through a positive switch SX3 and a negative switch SY2 corresponding to a faulty photovoltaic string PV3 are lowered. Further, the positive switch SX3 and the negative switch SY2 can be disconnected more safely and reliably, so that the multi-pole linked switch 20 can disconnect and isolate the fault more safely and reliably.

For another example, referring to FIG. 2*b*, in the case where the photovoltaic power generation system is normal, the photovoltaic strings PV1, PV2, and PV3 supply the generated power to the power conversion unit 10 through the multi-pole linked switch 20.

In the case where the fault occurs in the photovoltaic power generation system, for example, the photovoltaic string PV1 is short-circuited or reversely connected, referring to FIG. 2*b* (1), the current of the photovoltaic string PV2 and the current of the photovoltaic string PV3 flow into the photovoltaic string PV1. At this time, when the multi-pole linked switch 20 is directly disconnected, the positive switch SX1 and the negative switch SY1 corresponding to the photovoltaic string PV1 need to be disconnected when subjected to one time the short-circuit current or reverse connection current of a single photovoltaic string. At this time, the maximum disconnection current of the multi-pole linked switch 20 is one time the disconnection current of a single photovoltaic string. Moreover, during the reverse connection, the maximum disconnection voltage of the multi-pole linked switch 20 is two times the disconnection voltage of a single photovoltaic string.

According to FIG. 2*b* (2), when the switch tube Q in the power conversion unit is controlled by the control portion to short-circuit the positive input terminal and the negative input terminal of the power conversion unit 10, the current flowing through the positive switch SX1 and the negative switch SY1 corresponding to the photovoltaic string PV1 can be effectively lowered. Although the maximum disconnection current of the multi-pole linked switch 20 is still one time the disconnection current of a single photovoltaic string, the short-circuit current or the reverse connection current and the disconnection voltage flowing through the positive switch SX1 and negative switch SY1 corresponding to the faulty photovoltaic string PV1 are lowered. Further, the positive switch SX1 and the negative switch SY1 can be disconnected more safely and reliably, so that the multi-pole linked switch 20 can disconnect and isolate the fault more safely and reliably.

After the multi-pole linked switch 20 is disconnected, the photovoltaic string PV1 and the photovoltaic string PV2 are connected in parallel. When the photovoltaic string PV1 is short-circuited or reversely connected, the current of the photovoltaic string PV2 flows into the photovoltaic string PV1. Since the photovoltaic string PV1 can bear the current outputted by at most two photovoltaic strings which does not exceed the range that the photovoltaic string PV1 can bear, the photovoltaic string PV1 is effectively protected from being damaged.

It should be noted that the protection principle when the photovoltaic string PV2 is short-circuited or reversely connected is the same as the protection principle when the photovoltaic string PV1 is short-circuited or reversely connected. In order to avoid repetition, its details will not be described herein.

When the photovoltaic string PV3 is short-circuited or reversely connected, it can be seen from the principle described above that a current flowing through a positive switch SX2 and the negative switch SY2 corresponding to the photovoltaic string PV3 can be effectively reduced. Although the maximum disconnection current of the multi-pole linked switch 20 is unchanged, a short-circuit current or reverse connection current and a disconnection voltage flowing through a positive switch SX2 and the negative switch SY2 corresponding to the faulty photovoltaic string PV3 are lowered. Further, the positive switch SX2 and the negative switch SY2 can be disconnected more safely and reliably, so that the multi-pole linked switch 20 can disconnect and isolate the fault more safely and reliably.

For the protection principle of other system structures with N=3, reference can be made to the foregoing, and its details will not be described herein.

Figure 3A:
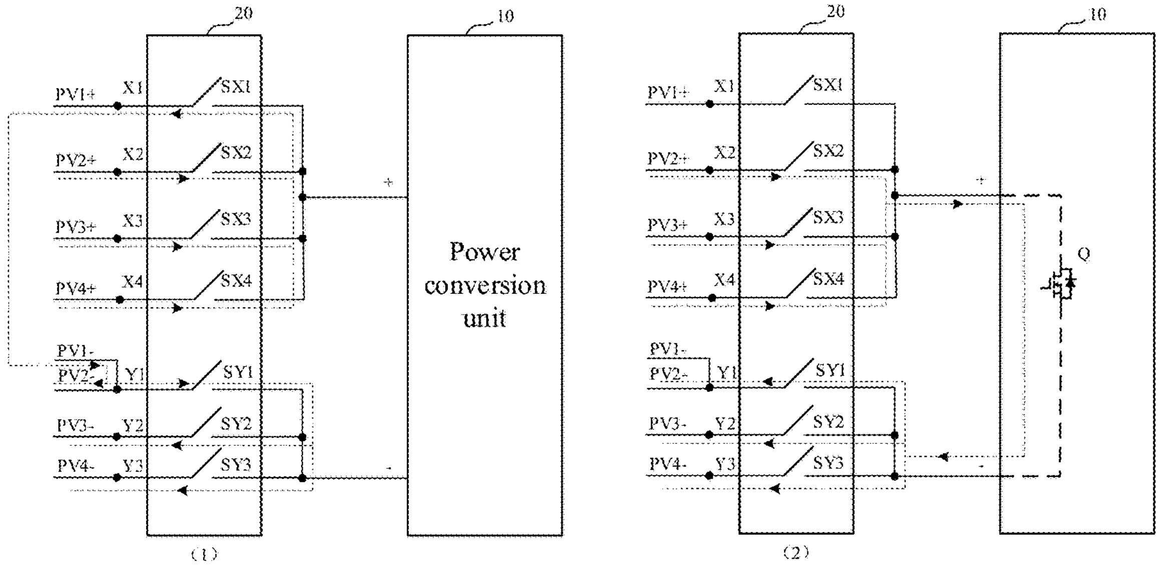
FIG. 3*a* and FIG. 3*b* are schematic structural diagrams of a photovoltaic power generation system having four photovoltaic strings according to an embodiment of the present disclosure.

For case 2: for example, with reference to FIG. 3*a*, in the case where the photovoltaic power generation system is normal, the photovoltaic strings PV1, PV2, PV3 and PV4 supply the generated power to the power conversion unit 10 through the multi-pole linked switch 20.

In the case where the fault occurs in the photovoltaic power generation system, for example, the photovoltaic string PV1 is short-circuited or reversely connected, with reference to FIG. 3*a* (1), a current of each of the photovoltaic string PV2, the photovoltaic string PV3, and the photovoltaic string PV4 flows into the photovoltaic string PV1. If the multi-pole linked switch 20 is directly disconnected at this time, the positive switch SX1 corresponding to the photovoltaic string PV1 needs to be disconnected when subjected to three times the short-circuit current of a single photovoltaic string, and the negative switch SY1 corresponding to the photovoltaic string PV1 needs to be disconnected when subjected to two times the short-circuit current or the reverse connection current of a single photovoltaic string. At this time, the maximum disconnection current of the multi-pole linked switch 20 is three times the disconnection current of a single photovoltaic string. During reverse connection, the multi-pole linked switch 20 also needs to be disconnected when subjected to two times the disconnection voltage of a single photovoltaic string.

According to FIG. 3*a* (2), when the switch tube Q in the power conversion unit is controlled by the control portion to short-circuit the positive input terminal and the negative input terminal of the power conversion unit 10, the current flowing through the positive switch SX1 and the negative switch SY1 corresponding to the photovoltaic string PV1 can be effectively lowered, and the short-circuit current or reverse connection current and a disconnection voltage flowing through the positive switch SX1 and the negative switch SY1 corresponding to the faulty photovoltaic string PV1 are lowered. At this time, the maximum disconnection current of the multi-pole linked switch 20 is one time the disconnection current of a single photovoltaic string. Moreover, the maximum disconnection voltage of the multi-pole linked switch 20 during reverse connection is one time the disconnection voltage of a single photovoltaic string. Compared with three times the disconnection current of a single photovoltaic string and two times the disconnection voltage of a single photovoltaic string, the maximum disconnection current and the maximum disconnection voltage of the multi-pole linked switch 20 are effectively reduced. Further, the positive switch SX1 and the negative switch SY1 are enabled to be disconnected more safely and reliably, so that the multi-pole linked switch 20 can disconnect and isolate the fault more safely and reliably.

After the multi-pole linked switch 20 is disconnected, no parallel connection occurs in the photovoltaic string. Therefore, the photovoltaic string cannot be damaged.

It should be noted that the protection principle when the photovoltaic string PV2 is short-circuited or reversely connected is the same as the protection principle when the photovoltaic string PV1 is short-circuited or reversely connected. In order to avoid repetition, its details will not be described herein.

When the photovoltaic string PV3 is short-circuited or reversely connected, it can be seen from the principle described above that when the multi-pole linked switch 20 is directly disconnected, each of the positive switch SX3 and the negative switch SY2 corresponding to the photovoltaic string PV3 needs to be disconnected when subjected to three times the short-circuit current or reverse connection current of a single photovoltaic string. At this time, the maximum disconnection current of the multi-pole linked switch 20 is three times the disconnection current of a single photovoltaic string. Moreover, during reverse connection, the multi-pole linked switch 20 also needs to be disconnected when subjected to two times the disconnection voltage of a single photovoltaic string. When the positive input terminal and the negative input terminal of the power conversion unit 10 are short-circuited, the current flowing through the positive switch SX3 and the negative switch SY2 corresponding to the photovoltaic string PV1 can be effectively lowered, and the short-circuit current or reverse connection current and a disconnection voltage flowing through the positive switch SX3 and the negative switch SY2 corresponding to the faulty photovoltaic string PV3 are lowered. At this time, the maximum disconnection current of the multi-pole linked switch 20 is two times the disconnection current of a single photovoltaic string. Moreover, the maximum disconnection voltage of the multi-pole linked switch 20 during reverse connection is one time the disconnection voltage of a single photovoltaic string. Compared with three times the disconnection current of a single photovoltaic string and two times the disconnection voltage of a single photovoltaic string, the maximum disconnection current and the maximum disconnection voltage of the multi-pole linked switch are effectively reduced. Further, the positive switch SX3 and the negative switch SY2 are enabled to be disconnected more safely and reliably, so that the multi-pole linked switch 20 can disconnect and isolate the fault more safely and reliably.

It should be noted that the protection principle when the photovoltaic string PV4 is short-circuited or reversely connected is the same as the protection principle when the photovoltaic string PV3 is short-circuited or reversely connected. In order to avoid repetition, its details will not be described herein.

Figure 3B:
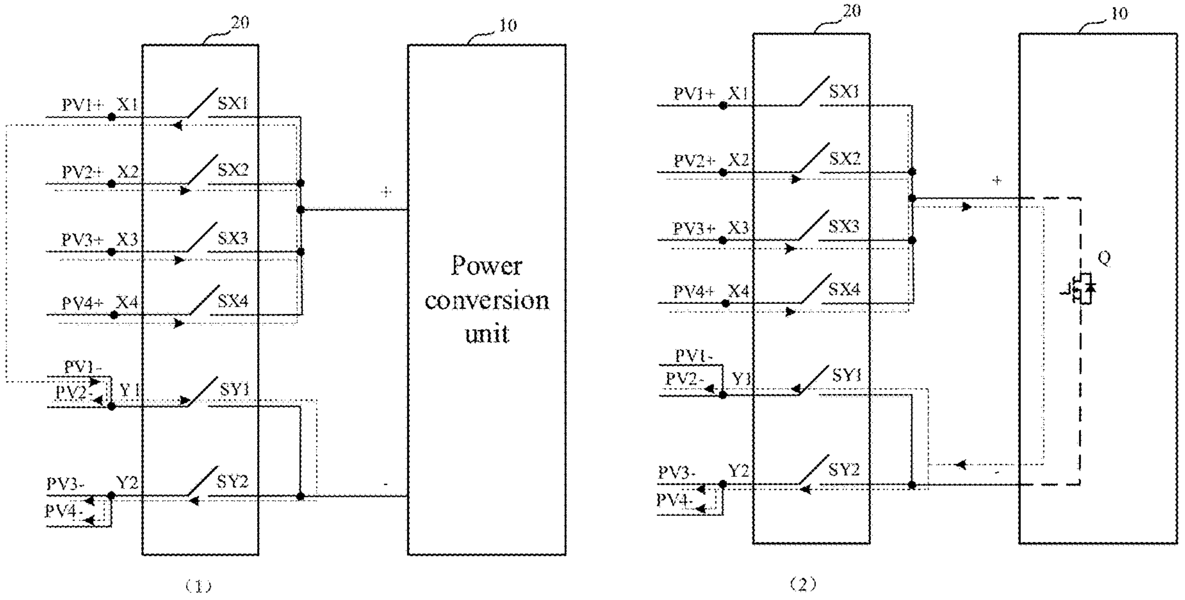

For another example, referring to FIG. 3*b*, in the case where the photovoltaic power generation system is normal, the photovoltaic strings PV1, PV2, PV3 and PV4 supply the generated power to the power conversion unit 10 through the multi-pole linked switch 20.

In the case where the fault occurs in the photovoltaic power generation system, for example, the photovoltaic string PV1 is short-circuited or reversely connected, referring to FIG. 3*b* (1), a current of each of the photovoltaic string PV2, the photovoltaic string PV3, and the photovoltaic string PV4 flows into the photovoltaic string PV1. At this time, when the multi-pole linked switch 20 is directly disconnected, the positive switch SX1 corresponding to the photovoltaic string PV1 needs to be disconnected when subjected to three times the short-circuit current or reverse connection current of a single photovoltaic string, and the negative switch SY1 corresponding to the photovoltaic string PV1 needs to be disconnected when subjected to two times the short-circuit current or reverse connection current of a single photovoltaic string. At this time, the maximum disconnection current of the multi-pole linked switch 20 is three times the disconnection current of a single photovoltaic string. Moreover, during reverse connection, the maximum disconnection voltage of the multi-pole linked switch 20 is two times the disconnection voltage of a single photovoltaic string.

According to FIG. 3*b* (2), when the switch tube Q in the power conversion unit is controlled by the control portion to short-circuit the positive input terminal and the negative input terminal of the power conversion unit 10, the current flowing through the positive switch SX1 and the negative switch SY1 corresponding to the photovoltaic string PV1 can be effectively lowered, and the short-circuit current or reverse connection current and a disconnection voltage flowing through the positive switch SX1 and the negative switch SY1 corresponding to the faulty photovoltaic string PV1 are lowered. At this time, the maximum disconnection current of the multi-pole linked switch 20 is two times the disconnection current of a single photovoltaic string. Moreover, the maximum disconnection voltage of the multi-pole linked switch 20 during reverse connection is one time the disconnection voltage of a single photovoltaic string. Compared with three times the disconnection current of a single photovoltaic string and two times the disconnection voltage of a single photovoltaic string, the maximum disconnection current and the maximum disconnection voltage of the multi-pole linked switch are effectively reduced. Further, the positive switch SX1 and the negative switch SY1 are enabled to be disconnected more safely and reliably, so that the multi-pole linked switch 20 can disconnect and isolate the fault more safely and reliably.

After the multi-pole linked switch 20 is disconnected, no parallel connection occurs in the photovoltaic string. Therefore, the photovoltaic string cannot be damaged.

It should be noted that the protection principle when the photovoltaic strings PV2, PV3 and PV4 are short-circuited or reversely connected is the same as the protection principle when the photovoltaic string PV1 is short-circuited or reversely connected. In order to avoid repetition, its details will not be described herein.

For the protection principle of other system structures with N=4, reference can be made to the foregoing, and its details will not be described herein.

Figure 4A:
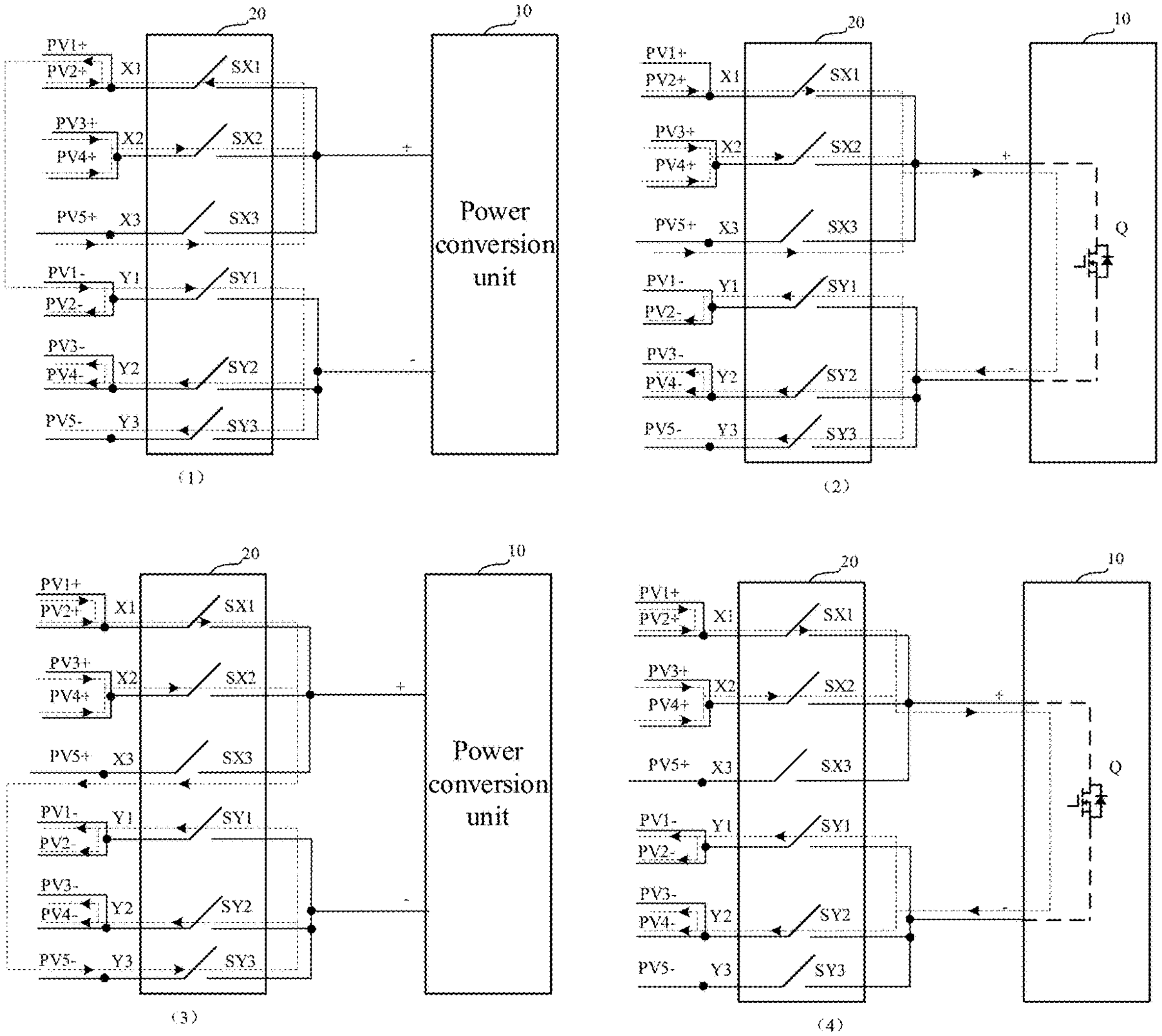
FIG. 4*a* and FIG. 4*b* are schematic structural diagrams of a photovoltaic power generation system having five photovoltaic strings according to an embodiment of the present disclosure.

For case 3: for example, with reference to FIG. 4*a*, in the case where the photovoltaic power generation system is normal, photovoltaic strings PV1, PV2, PV3, PV4 and PV5 supply the generated power to the power conversion unit 10 through the multi-pole linked switch 20.

In the case where the fault occurs in the photovoltaic power generation system, for example, the photovoltaic string PV1 is short-circuited or reversely connected, with reference to FIG. 4*a* (1), a current of each of the photovoltaic strings PV2, PV3, PV4 and PV5 flows into the photovoltaic string PV1. If the multi-pole linked switch 20 is directly disconnected at this time, the positive switch SX1 and the negative switch SY1 corresponding to the photovoltaic string PV1 need to be disconnected when subjected to three times the short-circuit current of a single photovoltaic string. At this time, the maximum disconnection current of the multi-pole linked switch 20 is three times the disconnection current of a single photovoltaic string. During reverse connection, the multi-pole linked switch 20 also needs to be disconnected when subjected to two times the disconnection voltage of a single photovoltaic string.

According to FIG. 4*a* (2), when the switch tube Q in the power conversion unit is controlled by the control portion to short-circuit the positive input terminal and the negative input terminal of the power conversion unit 10, the current flowing through the positive switch SX1 and the negative switch SY1 corresponding to the photovoltaic string PV1 can be effectively lowered, and the short-circuit current or reverse connection current and a disconnection voltage flowing through the positive switch SX1 and the negative switch SY1 corresponding to the faulty photovoltaic string PV1 are lowered. At this time, the maximum disconnection current of the multi-pole linked switch 20 is two times the disconnection current of a single photovoltaic string. Moreover, the maximum disconnection voltage of the multi-pole linked switch 20 during reverse connection is one time the disconnection voltage of a single photovoltaic string. Compared with three times the disconnection current of a single photovoltaic string and two times the disconnection voltage of a single photovoltaic string, the maximum disconnection current and the maximum disconnection voltage of the multi-pole linked switch 20 are effectively reduced. Further, the positive switch SX1 and the negative switch SY1 are enabled to be disconnected more safely and reliably, so that the multi-pole linked switch 20 can disconnect and isolate the fault more safely and reliably.

After the multi-pole linked switch 20 is disconnected, the photovoltaic string PV1 and the photovoltaic string PV2 are connected in parallel, and the photovoltaic string PV1 and the photovoltaic string PV2 are connected in parallel. When the photovoltaic string PV1 is short-circuited or reversely connected, the current of the photovoltaic string PV2 flows into the photovoltaic string PV1. Since the photovoltaic string PV1 can bear the current outputted by at most two photovoltaic strings which does not exceed the range that the photovoltaic string PV1 can bear, the photovoltaic string PV1 is effectively protected from being damaged.

It should be noted that the protection principle when each of the photovoltaic strings PV2, PV3 and PV4 is short-circuited or reversely connected is the same as the protection principle when the photovoltaic string PV1 is short-circuited or reversely connected. In order to avoid repetition, its details will not be described herein.

When the photovoltaic string PV5 is short-circuited or reversely connected, with reference to FIG. 4*a* (3), a current of each of the photovoltaic strings PV1, PV2, PV3 and PV4 flows into the photovoltaic string PV5. If the multi-pole linked switch 20 is directly disconnected at this time, the positive switch SX3 and the negative switch SY3 corresponding to the photovoltaic string PV5 need to be disconnected when subjected to four times the short-circuit current of a single photovoltaic string. At this time, the maximum disconnection current of the multi-pole linked switch 20 is four times the disconnection current of a single photovoltaic string. During reverse connection, the multi-pole linked switch 20 also needs to be disconnected when subjected to two times the disconnection voltage of a single photovoltaic string.

According to FIG. 4*a* (4), when the switch tube Q in the power conversion unit is controlled by the control portion to short-circuit the positive input terminal and the negative input terminal of the power conversion unit 10, the current flowing through the positive switch SX3 and the negative switch SY3 corresponding to the photovoltaic string PV5 can be effectively lowered, and the short-circuit current or reverse connection current and a disconnection voltage flowing through the positive switch SX3 and the negative switch SY3 corresponding to the faulty photovoltaic string PV5 are lowered. At this time, the maximum disconnection current of the multi-pole linked switch 20 is two times the disconnection current of a single photovoltaic string. Moreover, the maximum disconnection voltage of the multi-pole linked switch 20 during reverse connection is one time the disconnection voltage of a single photovoltaic string. Compared with four times the disconnection current of a single photovoltaic string and two times the disconnection voltage of a single photovoltaic string, the maximum disconnection current and the maximum disconnection voltage of the multi-pole linked switch are effectively reduced. Further, the positive switch SX3 and the negative switch SY3 are enabled to be disconnected more safely and reliably, so that the multi-pole linked switch 20 can disconnect and isolate the fault more safely and reliably.

Figure 4B:
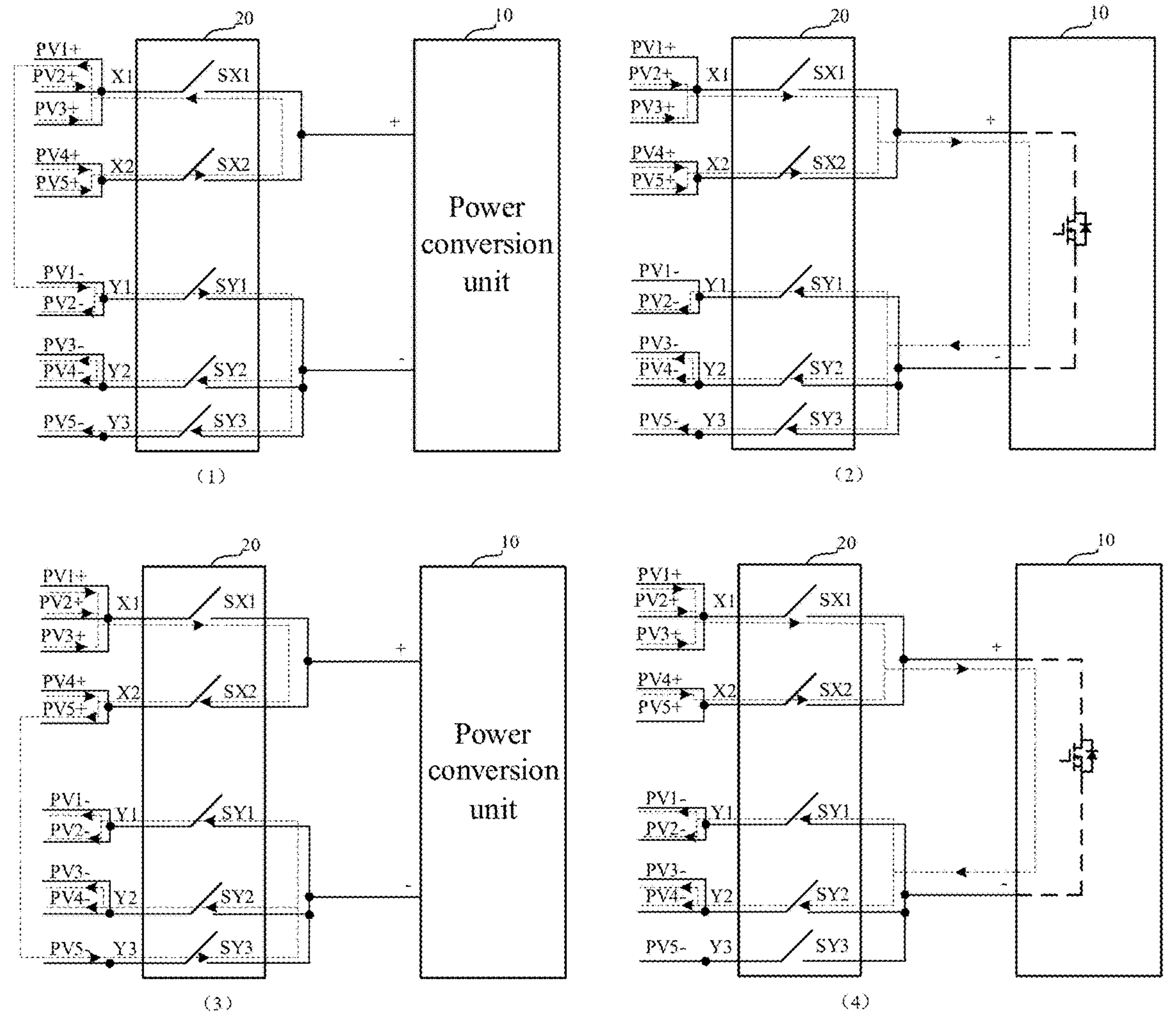

For another example, referring to FIG. 4*b*, in the case where the photovoltaic power generation system is normal, the photovoltaic strings PV1, PV2, PV3, PV4 and PV5 supply the generated power to the power conversion unit 10 through the multi-pole linked switch 20.

In the case where the fault occurs in the photovoltaic power generation system, for example, the photovoltaic string PV1 is short-circuited or reversely connected, referring to FIG. 4*b* (1), a current of each of the photovoltaic strings PV2, PV3, PV4 and PV5 flows into the photovoltaic string PV1. At this time, when the multi-pole linked switch 20 is directly disconnected, the positive switch SX1 corresponding to the photovoltaic string PV1 needs to be disconnected when subjected to two times the short-circuit current or reverse connection current of a single photovoltaic string, and the negative switch SY1 corresponding to the photovoltaic string PV1 needs to be disconnected when subjected to three times the short-circuit current or reverse connection current of a single photovoltaic string. At this time, the maximum disconnection current of the multi-pole linked switch 20 is three times the disconnection current of a single photovoltaic string. Moreover, during reverse connection, the maximum disconnection voltage of the multi-pole linked switch 20 is two times the disconnection voltage of a single photovoltaic string.

According to FIG. 4*b* (2), when the switch tube Q in the power conversion unit is controlled by the control portion to short-circuit the positive input terminal and the negative input terminal of the power conversion unit 10, the current flowing through the negative switch SY1 corresponding to the photovoltaic string PV1 can be effectively lowered, and the short-circuit current or reverse connection current and a disconnection voltage flowing through the negative switch SY1 corresponding to the faulty photovoltaic string PV1 are lowered. At this time, although the current flowing through the positive switch SX1 corresponding to the faulty photovoltaic string PV1 is not changed, the maximum disconnection current of the multi-pole linked switch 20 is two times the disconnection current of a single photovoltaic string. Moreover, the maximum disconnection voltage of the multi-pole linked switch 20 during reverse connection is one time the disconnection voltage of a single photovoltaic string. Compared with three times the disconnection current of a single photovoltaic string and two times the disconnection voltage of a single photovoltaic string, the maximum disconnection current and the maximum disconnection voltage of the multi-pole linked switch are effectively reduced. Further, the positive switch SX1 and the negative switch SY1 are enabled to be disconnected more safely and reliably, so that the multi-pole linked switch 20 can disconnect and isolate the fault more safely and reliably.

After the multi-pole linked switch 20 is disconnected, the photovoltaic string PV1 and the photovoltaic string PV2 are connected in parallel. When the photovoltaic string PV1 is short-circuited or reversely connected, the current of the photovoltaic string PV2 flows into the photovoltaic string PV1. Since the photovoltaic string PV1 can bear the current outputted by at most two photovoltaic strings which does not exceed the range that the photovoltaic string PV1 can bear, the photovoltaic string PV1 is effectively protected from being damaged.

It should be noted that the protection principle when the photovoltaic strings PV2, PV3 and PV4 is short-circuited or reversely connected is the same as the protection principle when the photovoltaic string PV1 is short-circuited or reversely connected. In order to avoid repetition, its details will not be described herein.

When the photovoltaic string PV5 is short-circuited or reversely connected, with reference to FIG. 4*b* (3), the current of each of the photovoltaic strings PV1, PV2, PV3 and PV4 flows into the photovoltaic string PV5. If the multi-pole linked switch 20 is directly disconnected at this time, the positive switch SX2 corresponding to the photovoltaic string PV5 needs to be disconnected when subjected to three times the short-circuit current or reverse connection current of a single photovoltaic string, and the negative switch SY3 needs to be disconnected when subjected to four times the short-circuit current or reverse connection current of a single photovoltaic string. At this time, the maximum disconnection current of the multi-pole linked switch 20 is four times the disconnection current of a single photovoltaic string. During reverse connection, the multi-pole linked switch 20 also needs to be disconnected when subjected to two times the disconnection voltage of a single photovoltaic string.

According to FIG. 4*b* (4), when the switch tube Q in the power conversion unit is controlled by the control portion to short-circuit the positive input terminal and the negative input terminal of the power conversion unit 10, the current flowing through the positive switch SX2 and the negative switch SY3 corresponding to the photovoltaic string PV5 can be effectively lowered, and the short-circuit current or reverse connection current and a disconnection voltage flowing through the positive switch SX2 and the negative switch SY3 corresponding to the faulty photovoltaic string PV5 are lowered. At this time, the maximum disconnection current of the multi-pole linked switch 20 is three times the disconnection current of a single photovoltaic string. Moreover, the maximum disconnection voltage of the multi-pole linked switch 20 during reverse connection is one time the disconnection voltage of a single photovoltaic string. Compared with four times the disconnection current of a single photovoltaic string and two times the disconnection voltage of a single photovoltaic string, the maximum disconnection current and the maximum disconnection voltage of the multi-pole linked switch are effectively reduced. Further, the positive switch SX2 and the negative switch SY3 are enabled to be disconnected more safely and reliably, so that the multi-pole linked switch 20 can disconnect and isolate the fault more safely and reliably.

Figure 5:
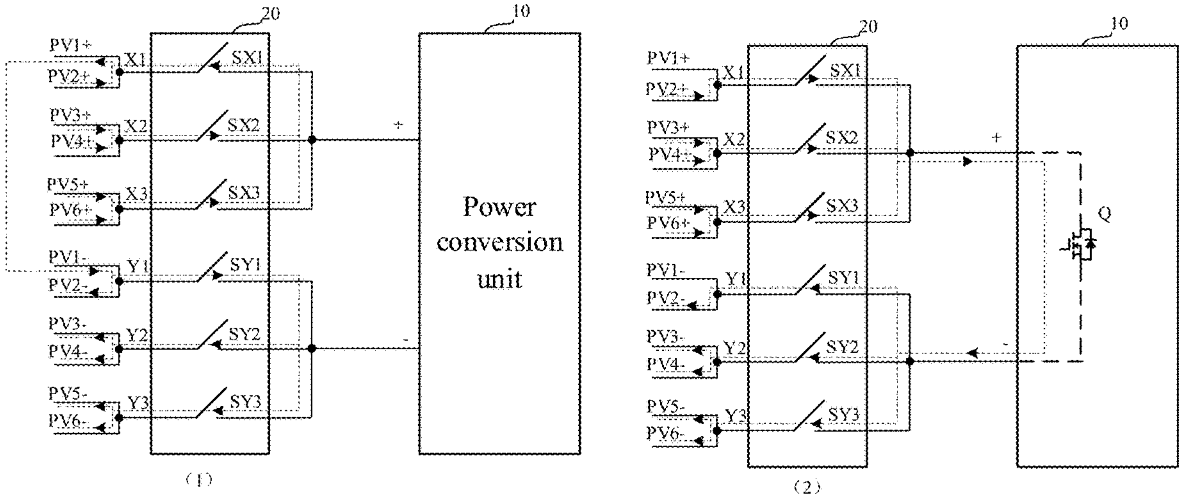
FIG. 5 is a schematic diagram of a photovoltaic power generation system having six photovoltaic strings according to an embodiment of the present disclosure.

For case 4: for example, with reference to FIG. 5, in the case where the photovoltaic power generation system is normal, photovoltaic strings PV1, PV2, PV3, PV4, PV5 and PV6 supply the generated power to the power conversion unit 10 through the multi-pole linked switch 20.

In the case where the fault occurs in the photovoltaic power generation system, for example, the photovoltaic string PV1 is short-circuited or reversely connected, with reference to FIG. 5 (1), a current of each of the photovoltaic strings PV2, PV3, PV4, PV5 and PV6 flows into the photovoltaic string PV1. If the multi-pole linked switch 20 is directly disconnected at this time, the positive switch SX1 and the negative switch SY1 corresponding to the photovoltaic string PV1 need to be disconnected when subjected to four times the short-circuit current or reverse connection current of a single photovoltaic string. At this time, the maximum disconnection current of the multi-pole linked switch 20 is four times the disconnection current of a single photovoltaic string. During reverse connection, the multi-pole linked switch 20 also needs to be disconnected when subjected to two times the disconnection voltage of a single photovoltaic string.

According to FIG. 5 (2), when the switch tube Q in the power conversion unit is controlled by the control portion to short-circuit the positive input terminal and the negative input terminal of the power conversion unit 10, the current flowing through the positive switch SX1 and the negative switch SY1 corresponding to the photovoltaic string PV1 can be effectively lowered, and the short-circuit current or reverse connection current and a disconnection voltage flowing through the positive switch SX1 and the negative switch SY1 corresponding to the faulty photovoltaic string PV1 are lowered. At this time, the maximum disconnection current of the multi-pole linked switch 20 is two times the disconnection current of a single photovoltaic string. Moreover, the maximum disconnection voltage of the multi-pole linked switch 20 during reverse connection is one time the disconnection voltage of a single photovoltaic string. Compared with four times the disconnection current of a single photovoltaic string and two times the disconnection voltage of a single photovoltaic string, the maximum disconnection current and the maximum disconnection voltage of the multi-pole linked switch 20 are effectively reduced. Further, the positive switch SX1 and the negative switch SY1 are enabled to be disconnected more safely and reliably, so that the multi-pole linked switch 20 can disconnect and isolate the fault more safely and reliably.

After the multi-pole linked switch 20 is disconnected, the photovoltaic string PV1 and the photovoltaic string PV2 are connected in parallel, the photovoltaic string PV3 and the photovoltaic string PV4 are connected in parallel, and the photovoltaic string PV5 and the photovoltaic string PV6 are connected in parallel. When the photovoltaic string PV1 is short-circuited or reversely connected, the current of the photovoltaic string PV2 flows into the photovoltaic string PV1. Since the photovoltaic string PV1 can bear the current outputted by at most two photovoltaic strings which does not exceed the range that the photovoltaic string PV1 can bear, the photovoltaic string PV1 is effectively protected from being damaged.

It should be noted that the protection principle when the photovoltaic strings PV2, PV3, PV4, PV5 and PV6 is short-circuited or reversely connected is the same as the protection principle when the photovoltaic string PV1 is short-circuited or reversely connected. In order to avoid repetition, its details will not be described herein.

Figure 6:
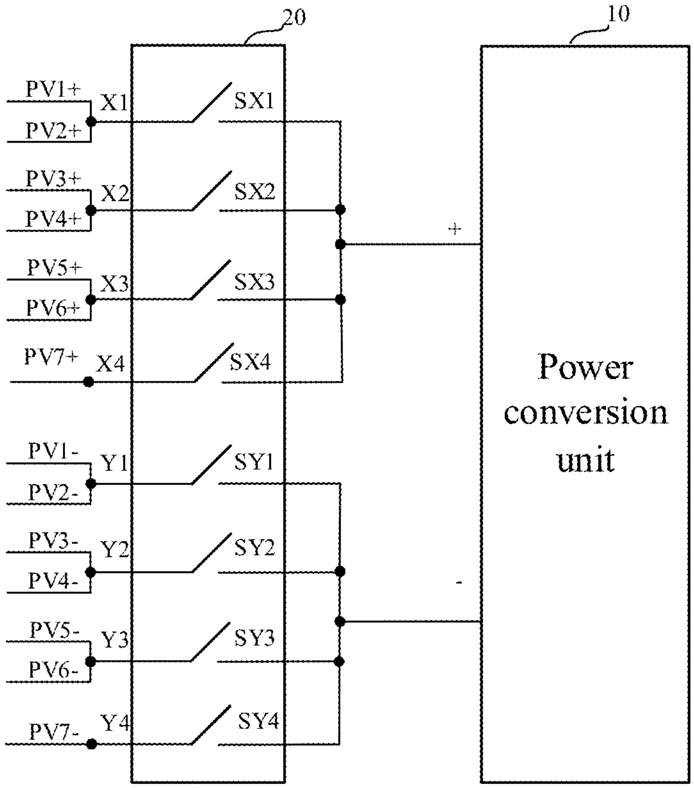
FIG. 6 is a schematic diagram of a photovoltaic power generation system having seven photovoltaic strings according to an embodiment of the present disclosure.

For case 5: for example, with reference to FIG. 6, the protection principle of the system is the same as the protection principle of the system illustrated in FIG. 4*a*. Compared with FIG. 4*a*, when a short circuit or reverse connection occurs in the photovoltaic string, the positive switch and the negative switch corresponding to the faulty photovoltaic string need to bear a great disconnection current.

For example, when the photovoltaic string PV1 is short-circuited or reversely connected, if the multi-pole linked switch 20 is directly disconnected, each of the positive switch SX1 and the negative switch SY1 corresponding to the photovoltaic string PV1 needs to be disconnected when subjected to five times the short-circuit current or reverse connection current of a single photovoltaic string, which obviously provides higher requirements for a disconnection capability of the pole switch.

For another example, when the photovoltaic string PV7 is short-circuited or reversely connected, if the multi-pole linked switch 20 is directly disconnected, each of the positive switch SX4 and the negative switch SY4 corresponding to the photovoltaic string PV7 needs to be disconnected when subjected to six times the short-circuit current or reverse connection current of a single photovoltaic string, obviously providing higher requirements for the disconnection capability of the pole switch.

The switch tube Q of the power conversion unit 10 is controlled by the control portion to be connected to short-circuit the positive input terminal and the negative input terminal of the power conversion unit 10, which can lower the maximum disconnection current of the multi-pole linked switch 20, enabling the multi-pole linked switch 20 to disconnect and isolate the fault more safely and reliably.

Figure 7:
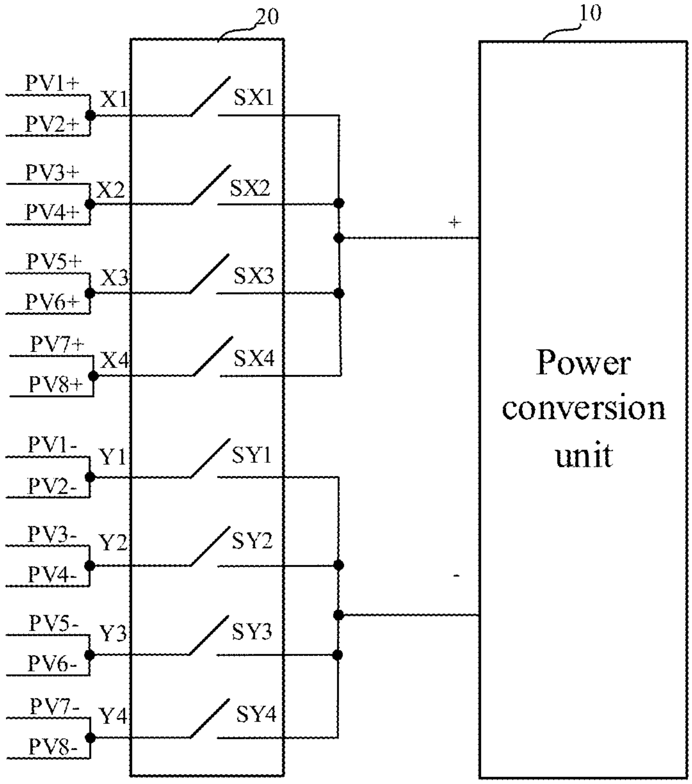
FIG. 7 is a schematic diagram of a photovoltaic power generation system having eight photovoltaic strings according to an embodiment of the present disclosure.

For case 6: for example, with reference to FIG. 7, the protection principle of the system is the same as the protection principle of the system illustrated in FIG. 5. Compared with FIG. 5, when a short circuit or reverse connection occurs in the photovoltaic string, the positive switch and the negative switch corresponding to the faulty photovoltaic string need to bear a great disconnection current.

For example, when the photovoltaic string PV1 is short-circuited or reversely connected, if the multi-pole linked switch 20 is directly disconnected, each of the positive switch SX1 and the negative switch SY1 corresponding to the photovoltaic string PV1 needs to be disconnected when subjected to six times the short-circuit current or reverse connection current of a single photovoltaic string, which obviously provides higher requirements for a disconnection capability of the pole switch.

The switch tube Q of the power conversion unit 10 is controlled by the control portion to be connected to short-circuit the positive input terminal and the negative input terminal of the power conversion unit 10, which can lower the maximum disconnection current of the multi-pole linked switch 20, enabling the multi-pole linked switch 20 to disconnect and isolate the fault more safely and reliably.

In the above embodiments, in the case where the fault occurs in the photovoltaic power generation system, the positive input terminal and the negative input terminal of the power conversion unit are short-circuited by controlling the switch tube in the power conversion unit, which can lower the current flowing through the multi-pole linked switch and improve the safety of the multi-pole linked switch during disconnection, enabling the multi-pole linked switch to disconnect and isolate the fault more safely and reliably. After the multi-pole linked switch is controlled to be disconnected, at most three of the N photovoltaic strings are connected in parallel, so that the photovoltaic string can be prevented from being damaged.

In some embodiments, each of the positive connection terminals is adapted to connect at most three photovoltaic strings; and/or each of the negative connection terminals is adapted to connect at most three photovoltaic strings. In this way, after the multi-pole linked switch 20 is disconnected, it is beneficial to realizing that there are at most three of the N photovoltaic strings connected in parallel, thereby achieving protection on the photovoltaic string.

In an exemplary embodiment of the present disclosure, when at most three photovoltaic strings connected by each positive connection terminal are provided, even four or more photovoltaic strings connected by the negative connection terminal are provided, the parallel connection of the photovoltaic strings requires that the positive electrode and the negative electrode of the photovoltaic string are correspondingly connected in parallel. Therefore, in a case where a number of photovoltaic strings connected by each positive connection terminal is limited to be smaller than or equal to three, at most three of the N photovoltaic strings are allowed to be connected in parallel after the multi-pole linked switch 20 is disconnected.

Figure 8A:
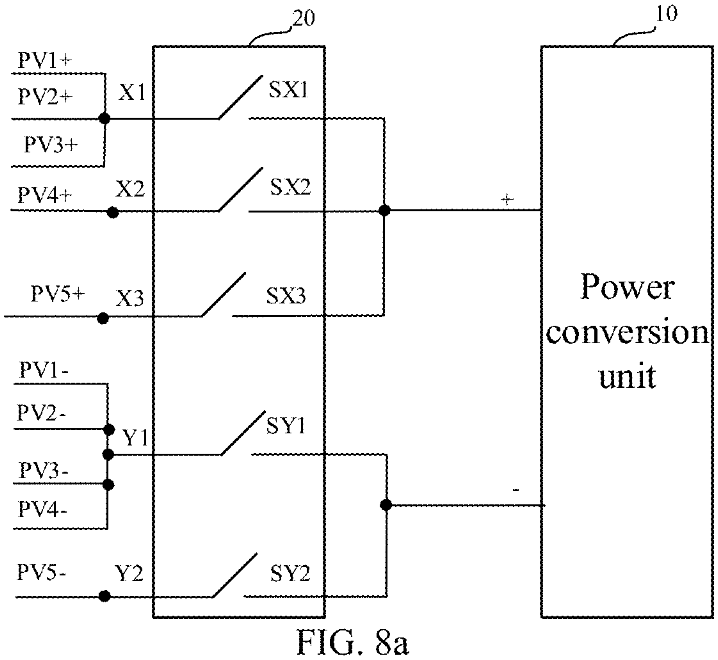
FIG. 8*a* and FIG. 8*b* are schematic structural diagrams of a photovoltaic power generation system having five photovoltaic strings according to other embodiments of the present disclosure.

Exemplarily, referring to FIG. 8*a*, the positive connection terminal X1 is connected to three photovoltaic strings PV1, PV2, and PV3, the positive connection terminal X2 is connected to one photovoltaic string PV4, and the positive connection terminal X3 is connected to one photovoltaic string PV5, i.e., the number of photovoltaic strings connected by each positive connection terminal does not exceed three. Meanwhile, the negative connection terminal Y1 is connected to four photovoltaic strings PV1, PV2, PV3, and PV4, and the negative connection terminal Y2 is connected to one photovoltaic string PV5. After the multi-pole linked switch 20 is disconnected, only the photovoltaic strings PV1, PV2, and PV3 are connected in parallel due to the limitation of the number of photovoltaic strings connected by the positive connection terminal X1, which satisfies that a parallel connection occurs in at most three of the N photovoltaic strings after the multi-pole linked switch 20 is disconnected.

Figure 8B:
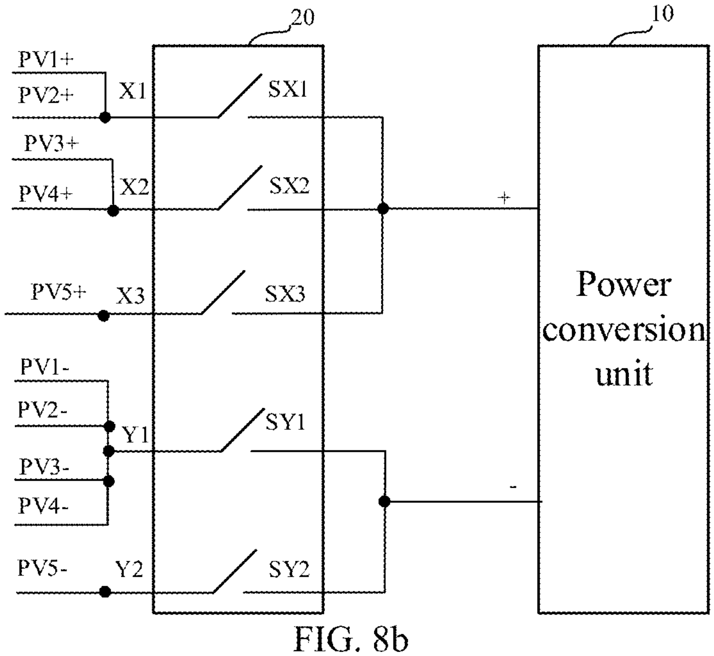

For another example, referring to FIG. 8*b*, the positive connection terminal X1 is connected to the two photovoltaic strings PV1 and PV2, the positive connection terminal X2 is connected to the two photovoltaic strings PV3 and PV4, and the positive connection terminal X3 is connected to one photovoltaic string PV5, i.e., the number of photovoltaic strings connected by each positive connection terminal does not exceed three. Meanwhile, the negative connection terminal Y1 is connected to four photovoltaic strings PV1, PV2, PV3, and PV4, and the negative connection terminal Y2 is connected to one photovoltaic string PV5. After the multi-pole linked switch 20 is disconnected, only the photovoltaic string PV1 and the photovoltaic string PV2, and the photovoltaic string PV3 and the photovoltaic string PV4 are connected in parallel due to the limitation of the number of photovoltaic strings connected by the positive connection terminal X1, which satisfies that a parallel connection occurs in at most three of the N photovoltaic strings after the multi-pole linked switch 20 is disconnected.

It should be noted that, for other cases, reference can be made to the foregoing, and its details will not be described herein.

Similarly, in a case where the number of photovoltaic strings connected by each negative connection terminal is at most three, and in a case where the number of photovoltaic strings connected by each positive connection terminal is at most three and the number of photovoltaic strings connected by each negative connection terminal is at most three, it can be satisfied that the a parallel connection occurs in at most three of the N photovoltaic strings after the multi-pole linked switch 20 is disconnected, and its details will not be described herein.

In the above embodiments, by limiting the number of photovoltaic strings connected by each connection terminal, it is beneficial to realize that at most three of the N photovoltaic strings are connected in parallel after the multi-pole linked switch is disconnected, thereby protecting the photovoltaic string.

Further, in the case where the number of photovoltaic strings connected by each connection terminal is limited, in some embodiments, negative electrodes of the plurality of photovoltaic strings adapted to be connected by the same positive connection terminal are connected to the at least two negative connection terminals, respectively. In this way, the number of photovoltaic strings connected in parallel in the N photovoltaic strings can be reduced after the multi-pole linked switch 20 is disconnected, which is beneficial to allow for the occurrence of a parallel connection in at most three of the N photovoltaic strings after the multi-pole linked switch is disconnected.

In an exemplary embodiment of the present disclosure, in some cases, the same positive connection terminal may be connected to the plurality of photovoltaic strings, for example, connected to two, three or more photovoltaic strings. At this time, the negative electrodes of the plurality of photovoltaic strings connected to the positive connection terminal may be split and connected to two or more negative connection terminals. Since the parallel connection of the photovoltaic string requires a correspondingly parallel connection of the positive electrode and the negative electrode of the photovoltaic string, when the negative electrodes of the plurality of photovoltaic strings connected to the same positive connection terminal are split and connected to different negative connection terminals, the photovoltaic strings connected in parallel can be reduced after the multi-pole linked switch 20 is disconnected.

Figure 9A:
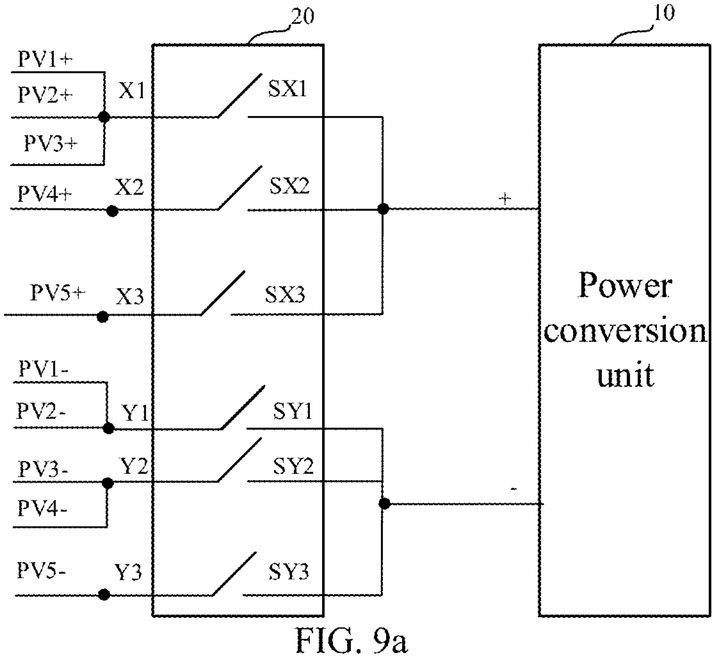
FIG. 9*a* and FIG. 9*b* are schematic structural diagrams of a photovoltaic power generation system having five photovoltaic strings according to yet another embodiment of the present disclosure.

Exemplarily, referring to FIG. 9*a*, the positive connection terminal X1 is connected to the three photovoltaic strings PV1, PV2, and PV3. Meanwhile, the negative electrode of each of the photovoltaic string PV1 and the photovoltaic string PV2 is connected to the negative connection terminal Y1, and the negative electrode of the photovoltaic string PV3 is connected to the negative connection terminal Y2. After the multi-pole linked switch 20 is disconnected, the negative electrodes of the two photovoltaic strings PV1 and PV2 in the three photovoltaic strings connected to the positive connection terminal X1 are connected to the negative connection terminal Y1, and the negative electrode of one photovoltaic string PV3 is connected to the negative connection terminal Y2. Therefore, only the photovoltaic string PV1 and the photovoltaic string PV2 are connected in parallel. Compared with the splitting, the number of parallel photovoltaic modules is reduced. In this way, not only the occurrence of the parallel connection of at most three of the N photovoltaic strings is satisfied after the multi-pole linked switch 20 is disconnected, but the current flowing into the faulty photovoltaic string is also further reduced, thereby improving the safety of the photovoltaic string.

Figure 9B:
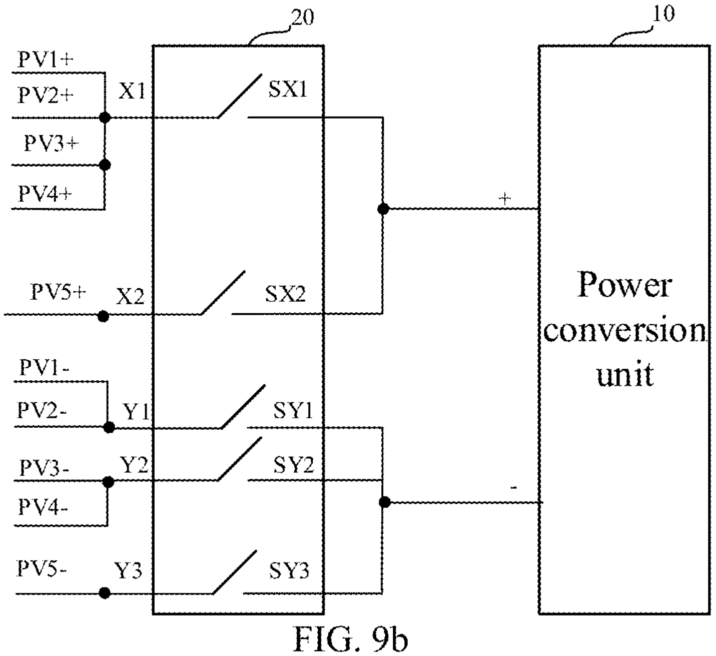

For another example, referring to FIG. 9*b*, the positive connection terminal X1 is connected to four photovoltaic strings PV1, PV2, PV3, and PV4. Meanwhile, the negative electrodes of the photovoltaic string PV1 and the photovoltaic string PV2 are connected to the negative connection terminal Y1, and the negative electrodes of the photovoltaic string PV3 and the photovoltaic string PV4 are connected to the negative connection terminal Y2. After the multi-pole linked switch 20 is disconnected, since the negative electrodes of the two photovoltaic strings PV1 and PV2 in the four photovoltaic strings connected to the positive connection terminal X1 are connected to the negative connection terminal Y1, the negative electrodes of the two photovoltaic strings PV3 and PV4 are connected to the negative connection terminal Y2. Therefore, the photovoltaic string PV1 and the photovoltaic string PV2 are connected in parallel, and the photovoltaic string PV3 and the photovoltaic string PV4 are connected in parallel. Compared with the number of photovoltaic modules before un-splitting, the number of photovoltaic modules connected in parallel is reduced, which satisfies that a parallel connection occurs in at most three of the N photovoltaic strings after the multi-pole linked switch 20 is disconnected.

It should be noted that, for other cases, reference can be made to the foregoing, and its details will not be described herein.

In the above embodiments, the negative electrodes of the plurality of photovoltaic strings connected to the same positive connection terminal are respectively connected to the at least two negative connection terminals, which is beneficial to enabling a parallel connection to occur in at most three of the N photovoltaic strings after the multi-pole linked switch is disconnected, thereby protecting the photovoltaic string.

In some embodiments, when any positive connection terminal is adapted to connect at least four photovoltaic strings, at least two negative connection terminals are adapted to connect negative electrodes of the at least four photovoltaic strings, and each of the at least two negative connection terminals is adapted to connect at most three of the at least four photovoltaic strings.

In an exemplary embodiment of the present disclosure, since the parallel connection of the photovoltaic string requires a parallel connection between the positive electrodes and the negative electrodes of the photovoltaic strings, when the number of photovoltaic strings connected by any one positive connection terminal is too many, for example, four or more photovoltaic strings connected by any one positive connection terminal are provided, a connection of the photovoltaic string can be limited through the negative connection terminal. For example, at least two negative connection terminals are connected to the photovoltaic string connected to the same positive connection terminal, and the number of photovoltaic strings connected to the same negative connection terminal is up to three, such that at most three of the N photovoltaic strings are connected in parallel after the multi-pole linked switch 20 is disconnected.

Figure 10A:
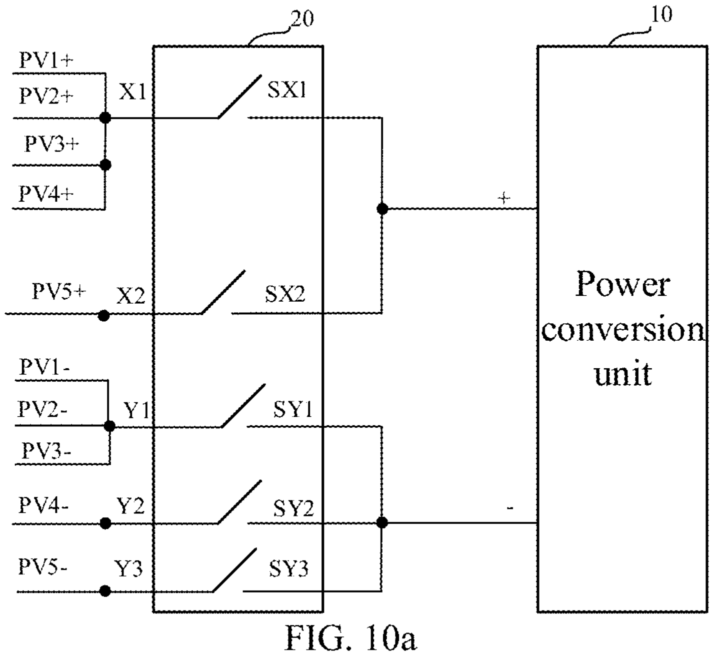
FIG. 10*a* and FIG. 10*b* are schematic structural diagrams of a photovoltaic power generation system having five photovoltaic strings according to still yet another embodiment of the present disclosure.

Exemplarily, referring to FIG. 10*a*, the positive connection terminal X1 is connected to four photovoltaic strings PV1, PV2, PV3, and PV4. Meanwhile, the negative electrode of each of the photovoltaic string PV1, the photovoltaic string PV2, and the photovoltaic string PV3 is connected to the negative connection terminal Y1, and the negative electrode of the photovoltaic string PV4 is connected to the negative connection terminal Y2. After the multi-pole linked switch 20 is disconnected, the negative electrodes of the three photovoltaic strings PV1, PV2, and PV3 in the four photovoltaic strings connected to the positive connection terminal X1 are connected to the negative connection terminal Y1, and the negative electrode of one photovoltaic string PV4 is connected to the negative connection terminal Y2. Therefore, at this time, there are the photovoltaic string PV1, the photovoltaic string PV2, and the photovoltaic string PV3 connected in parallel. It is satisfied that a parallel connection occurs in at most three of the N photovoltaic strings after the multi-pole linked switch 20 is disconnected.

Figure 10B:
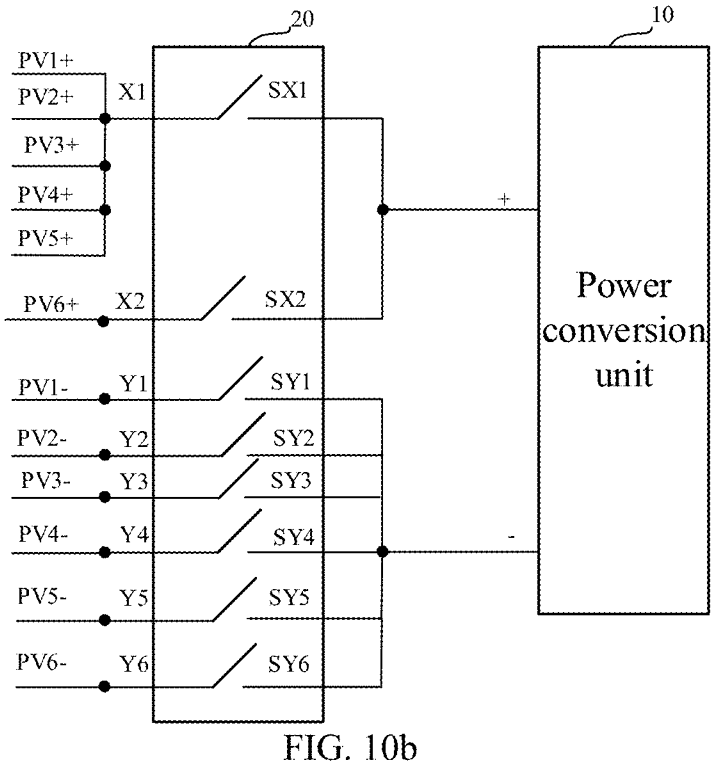

For another example, referring to FIG. 10*b*, the positive connection terminal X1 is connected to five photovoltaic strings PV1, PV2, PV3, PV4, and PV5. Meanwhile, each of the negative electrodes of the photovoltaic strings is connected to one negative connection terminal. After the multi-pole linked switch 20 is disconnected, since the negative electrodes of the five photovoltaic strings PV1, PV2, PV3, PV4, and PV5 connected to the positive connection terminal X1 are respectively connected to different negative connection terminals, no parallel connection occurs in the photovoltaic strings, which satisfies that a parallel connection occurs in at most three of the N photovoltaic strings after the multi-pole linked switch 20 is disconnected.

Similarly, in some embodiments, when any negative connection terminal is adapted to connect at least four photovoltaic strings, at least two positive connection terminals are adapted to connect positive electrodes of the at least four photovoltaic strings, and each of the at least two positive connection terminals is adapted to connect to at most three of the at least four photovoltaic strings. In the same way, it is beneficial to realize that after the multi-pole linked switch is disconnected, there are at most three of the N photovoltaic strings connected in parallel, thereby achieving the protection for the photovoltaic string. In an exemplary embodiment of the present disclosure, reference can be made to the foregoing, and its details will not be described herein.

In the above embodiments, when any positive connection terminal is adapted to connect at least four photovoltaic strings, the photovoltaic string connected to the negative connection terminal is limited. Alternatively, when any negative connection terminal is adapted to connect at least four photovoltaic strings, the photovoltaic string connected to the positive connection terminal is limited. It is beneficial to realize that at most three of the N photovoltaic strings are connected in parallel after the multi-pole linked switch is disconnected, thereby protecting the photovoltaic string.

In some embodiments, the control portion is further configured to, subsequent to short-circuiting the positive input terminal and the negative input terminal of the power conversion unit 10: obtain at least one of a current value of a branch where each photovoltaic string is located, a current value of a branch where each pole switch is located, and a current value of a direct-current bus; and control, in response to determining a power generation current of the photovoltaic power generation system to be smaller than a first predetermined value, the multi-pole linked switch 20 to be disconnected according to the at least one of the current value of the branch where each photovoltaic string is located, the current value of the branch where each pole switch is located, and the current value of the direct-current bus.

Figure 11A:
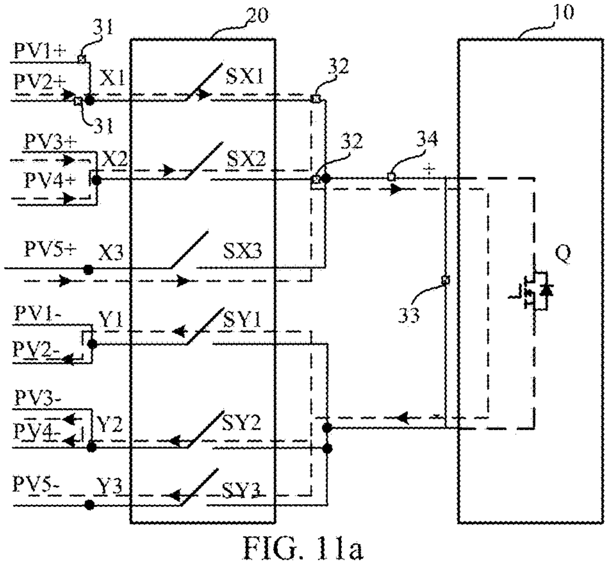
FIG. 11*a* and FIG. 11*b* are schematic structural diagrams of a photovoltaic power generation system having five photovoltaic strings according to some embodiments of the present disclosure.

It should be noted that the branch refers to a route through which a branch current of a parallel circuit flows. Referring to FIG. 11*a*, a line where the photovoltaic string PV1 is located may be referred to as a branch, a line formed after the photovoltaic string PV1 and the photovoltaic string PV2 are connected in parallel may be referred to as a branch, and a line where the positive switch SX1 is located may be referred to as a branch, and so on. A line between the multi-pole linked switch 20 and the power conversion unit 10 is referred to as a direct-current bus. The first predetermined value may be calibrated according to the actual situations, which is not limited herein specifically.

In an exemplary embodiment of the present disclosure, after the positive input terminal and the negative input terminal of the power conversion unit 10 are short-circuited, a power generation current of the photovoltaic power generation system can be determined first, and then the multi-pole linked switch 20 is controlled to be disconnected in a case where the power generation current is small, such that safety and reliability of the multi-pole linked switch 20 during disconnection are further improved. There are many ways to determine whether the power generation current of the photovoltaic power generation system is smaller than the first predetermined value. For example, it can be determined based on the current value of the branch where the photovoltaic string is located, the current value of the branch where the pole switch is located, the current value of the direct-current bus, or the mutual combination of the three current values, and the specific manner is not limited herein.

For example, referring to FIG. 11*a*, after the positive input terminal and the negative input terminal of the power conversion unit 10 are short-circuited, the current value of the branch where each photovoltaic string is located, such as a current value of a branch where each of the photovoltaic strings PV1, PV2, PV3, PV4 and PV5 is located, can be obtained, and the current value is summed to obtain the power generation current of the photovoltaic power generation system. Alternatively, the current value of the branch where each pole switch is located, such as a current value of a branch where each of the positive switches SX1, SX2, and SX3 is located, is obtained, and the current value is summed to obtain the power generation current of the photovoltaic power generation system. Alternatively, the current value of the direct-current bus is obtained to obtain the power generation current of the photovoltaic power generation system. Then, when the power generation current is smaller than the first predetermined value, i.e., when the current flowing into the multi-pole linked switch 20 is small, the multi-pole linked switch 20 is controlled by the control portion to be disconnected, to further improve the safety and reliability of the multi-pole linked switch 20 when the multi-pole linked switch 20 is disconnected.

In the above embodiments, after the positive input terminal and the negative input terminal of the power conversion unit are short-circuited, in a case where it is determined that the power generation current of the photovoltaic power generation system is small, the multi-pole linked switch is controlled to be disconnected, which can further improve the safety and reliability of the multi-pole linked switch during disconnection.

In some embodiments, the control portion is further configured to obtain an illumination intensity subsequent to short-circuiting the positive input terminal and the negative input terminal of the power conversion unit 10, and control the multi-pole linked switch 20 to be disconnected when the illumination intensity is smaller than a predetermined intensity.

It should be noted that the illumination intensity may be obtained by an illumination sensor or the like. The predetermined intensity may be calibrated according to the actual situations, which is not limited herein.

In an exemplary embodiment of the present disclosure, after the positive input terminal and the negative input terminal of the power conversion unit 10 are short-circuited, the current illumination intensity can be obtained firstly. Moreover, in a case where the illumination intensity is small, the power generation current of the corresponding photovoltaic power generation system is small, allowing the current flowing through the multi-pole linked switch 20 to be small. In this way, the safety and reliability of the multi-pole linked switch 20 can be further improved when the multi-pole linked switch 20 is controlled to be disconnected.

In the above embodiments, after the positive input terminal and the negative input terminal of the power conversion unit are short-circuited, the multi-pole linked switch is controlled to be disconnected in the case where the illumination intensity is small. The illumination intensity is small, the power generation current of the corresponding photovoltaic power generation system is small, and the current flowing through the multi-pole linked switch is small. Therefore, the safety and reliability of the multi-pole linked switch during disconnection can be further improved.

In some embodiments, the fault protection device further includes a parameter detection portion. The parameter detection portion is configured to detect at least one of a parameter value of a branch where each photovoltaic string is located, a parameter value of a branch where each pole switch is located, and a parameter value of a direct-current bus, such that the control portion detects the fault in the photovoltaic power generation system according to the at least one of the parameter value of the branch where each photovoltaic string is located, the parameter value of the branch where each pole switch is located, and the parameter value of the direct-current bus.

It should be noted that the fault may include a short-circuit fault or a reverse connection fault. The parameter value may include a voltage, a current value, a temperature, or a power, etc. For example, a short-circuit fault or a reverse connection fault in the photovoltaic power generation system can be determined based on the current value, the temperature, the power, and the like of the branch where each photovoltaic string is located. For another example, a short-circuit fault or a reverse connection fault in the photovoltaic power generation system can be determined based on the current value, the temperature, the power, and the like of the branch where each pole switch is located. For another example, a short-circuit fault or a reverse connection fault in the photovoltaic power generation system can be determined based on the voltage, the current value, the temperature, and the like of the direct-current bus.

For example, during operation of the photovoltaic power generation system, the parameter value, such as the current value, of the branch where each photovoltaic string is located can be obtained in real time through the parameter detection portion. Normally, the current value of the branch where each photovoltaic string is located is an output current of the photovoltaic string during normal operation. When the photovoltaic string is short-circuited or reversely connected, output currents of other photovoltaic strings are reversely poured to the faulty photovoltaic string, resulting in an increase in the current value of the faulty photovoltaic string. Meanwhile, the current is reversed. Therefore, based on the current value of the faulty photovoltaic string, the fault in the photovoltaic power generation system can be simply and accurately determined.

Figure 11B:
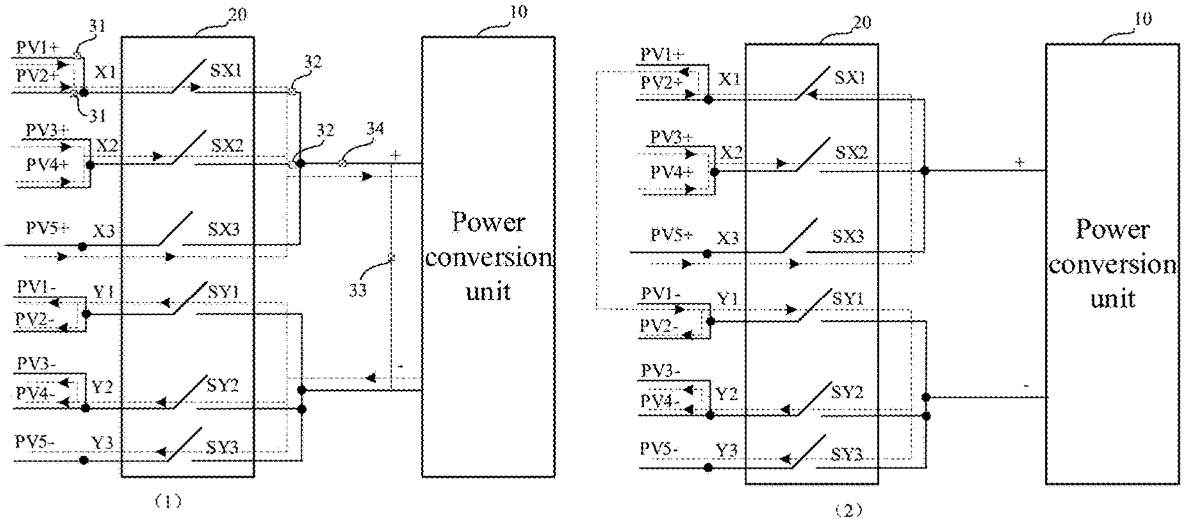

For example, referring to FIG. 11*b* (1), in a normal case, the current value of the branch where each photovoltaic string is located is the output current of the photovoltaic string during normal operation. When the photovoltaic string PV1 is short-circuited or reversely connected, referring to FIG. 11*b* (2), an output current of each of the photovoltaic strings PV2, PV3, PV4 and PV5 is reversely poured to the photovoltaic string PV1, so that the current of the branch where the photovoltaic string PV1 is located is increased to four times the short-circuit current or reverse connection current of a single photovoltaic string. Moreover, the current direction is opposite to that in normal. Therefore, a short-circuit fault or a reverse connection fault in the current photovoltaic power generation system can be determined based on the detected current value of the branch where the photovoltaic string PV1 is located.

For another example, during the operation of the photovoltaic power generation system, the parameter value, such as the current value, of the branch where each pole switch is located can be obtained in real time through the parameter detection portion. In a normal case, the current value of the branch where each pole switch is located is a sum of the output current or the output current of the photovoltaic string connected to the pole switch. When the photovoltaic string is short-circuited or reversely connected, the current of the branch where the corresponding pole switch is located may be increased and reversed. Therefore, based on the current value of the pole switch, the fault in the photovoltaic power generation system can be simply and accurately determined.

Exemplarily, referring to FIG. 11*b* (1), in a normal case, a current value of a branch where the positive switch SX1 is located and a current value of a branch where the negative switch SY1 is located is a sum of the output current of the photovoltaic string PV1 and the output current of the photovoltaic string PV2, a current value of a branch where the positive switch SX2 is located and a current value of a branch where the negative switch SY2 is located is a sum of the output current of the photovoltaic string PV3 and the output current of the photovoltaic string PV4, and a current value of a branch where the positive switch SX3 is located and a current value of a branch where the negative switch SY3 is located is an output current of the photovoltaic string PV5. When a short-circuit or reverse connection occurs in the photovoltaic string PV1, referring to FIG. 11*b* (2), a current value flowing through the branch where the positive electrode switch SX1 is located and the branch where the negative electrode switch SY1 is located is the sum of the output current of the photovoltaic string PV3, the output current of the photovoltaic string PV4 and the output current of the photovoltaic string PV5. The current value is increased, and the current direction is opposite to a normal current direction. Therefore, based on the detected current value of the branch where the positive switch SX1 is located or the detected current value of the branch where the negative switch SY1 is located, a short-circuit fault or a reverse connection fault in the current photovoltaic power generation system can be determined.

For another example, during the operation of the photovoltaic power generation system, the current value of the direct-current bus can be obtained in real time through the parameter detection portion. In a normal case, the current value of the direct-current bus is a sum of the output currents of the N photovoltaic strings. When the photovoltaic string is short-circuited or reversely connected, few current flows through the direct-current bus. Therefore, based on the current value of the direct-current bus, the fault in the photovoltaic power generation system can be simply and accurately determined.

For example, referring to FIG. 11*b* (1), in a normal case, the current value of the direct-current bus is a sum of the output currents of the five photovoltaic strings. When the photovoltaic string PV1 is short-circuited or reversely connected, referring to FIG. 11*b* (2), the output current of each of the photovoltaic strings PV2, PV3, PV4 and PV5 is reversely poured to the photovoltaic string PV1 through the multi-pole linked switch 20, and there are few currents flowing through the direct-current bus. Therefore, a short-circuit fault or a reverse connection fault in the current photovoltaic power generation system can determined based on the detected current value of the direct-current bus.

In the above embodiments, the fault in the photovoltaic power generation system can be simply and accurately detected by detecting one or more of the parameter value of the branch where the photovoltaic string is located, the parameter value of the branch where the pole switch is located, and the parameter value of the direct-current bus. Moreover, there are a plurality of detection ways.

In some embodiments, the parameter detection portion includes at least one of a first current sensor and a second current sensor. The first current sensor is configured to detect first current information of a branch where any photovoltaic string is located and transmit the first current information to the control portion; and the second current sensor is configured to detect second current information of a branch where any pole switch is located and transmit the second current information to the control portion. It should be noted that, "any" herein refers to that sensors provided on each branch are not distinguished.

For example, referring to FIG. 11*a* and FIG. 11*b*, a first current sensor 31 may be provided on the branch where each photovoltaic string is located. In an exemplary embodiment of the present disclosure, the first current sensor 31 may be provided at a positive electrode of each photovoltaic string. The current information of the branch where a corresponding photovoltaic string is located is obtained through the first current sensor 31, is recorded as first current information, may include a current value and a current direction, and transmits the first current information to the control portion.

Alternatively, a second current sensor 32 is provided on the branch where each pole switch is located. In an exemplary embodiment of the present disclosure, the second current sensor 32 may be provided on the branch where each positive switch is located. The current information of the branch where the corresponding pole switch is located is obtained through the second current sensor 32, is recorded as the second current information, may include a current value and a current direction, and transmits the second current information to the control portion.

Alternatively, the first current sensor 31 is provided on the branch where each photovoltaic string is located, and the second current sensor 32 is provided on the branch where each pole switch is located. The first current sensor 31 and the second current sensor 32 obtain the first current information and the second current information and transmit the first current information and the second current information to the control portion.

Further, the control portion is further configured to: detect the fault in the photovoltaic power generation system in response to determining a current direction of the branch where the photovoltaic string is located to be opposite to a predetermined direction according to the first current information, or detect the fault in the photovoltaic power generation system in response to determining a current direction of the branch where the pole switch is located to be opposite to the predetermined direction according to the second current information; or detect the fault in the photovoltaic power generation system in response to determining the current direction of the branch where the photovoltaic string is located to be opposite to the predetermined direction according to the first current information and determining the current direction of the branch where the pole switch is located to be opposite to the predetermined direction according to the second current information.

That is, the control portion may determine the fault in the photovoltaic power generation system based on the current direction of the branch where the photovoltaic string is located, the current direction of the branch where the pole switch is located, the current direction of the branch where the photovoltaic string is located and the current direction of the branch where the pole switch is located.

Exemplarily, referring to FIG. 11*b* (1), in a normal case, the current direction of the branch where each photovoltaic string is located and the current direction of the branch where each pole switch is located are as arrow directions in the drawing. When the photovoltaic string PV1 is short-circuited or reversely connected, referring to FIG. 11*b* (2), the output current of each of the photovoltaic strings PV2, PV3, PV4 and PV5 is reversely poured to the photovoltaic string PV1, allowing the current direction of the branch where the photovoltaic string PV1 is located and a current direction of a branch where the positive switch SX1 and the negative switch SY1 corresponding to the photovoltaic string PV1 are located to be opposite their normal directions. Therefore, in response to determining the current direction of the branch where the photovoltaic string PV1 is located to be opposite to the predetermined direction according to the first current information, or in response to determining the current direction of the branch where the positive switch SX1 is located to be opposite to the predetermined direction according to the second current information, or in response to determining the current direction of the branch where the photovoltaic string PV1 is located to be opposite to the predetermined direction according to the first current information and determining the current direction of the branch where the positive switch SX1 is located to be opposite to the predetermined direction according to the second current information, the fault in the photovoltaic power generation system can be determined.

In the above embodiments, based on the detected current direction, the fault in the photovoltaic power generation system can be simply and accurately detected.

Further, the control portion is further configured to: detect the fault in the photovoltaic power generation system in response to determining an absolute current value of the branch where the photovoltaic string is located to be greater than a first predetermined current threshold according to the first current information; or detect the fault in the photovoltaic power generation system in response to determining an absolute current value of the branch where the pole switch is located to be greater than a second predetermined current threshold according to the second current information; or detect the fault in the photovoltaic power generation system in response to determining the absolute current value of the branch where the photovoltaic string is located to be greater than the first predetermined current threshold according to the first current information and determining the absolute current value of the branch where the pole switch is located to be greater than the second predetermined current threshold according to the second current information.

That is, the control portion may determine the fault in the photovoltaic power generation system based on the current of the branch where the photovoltaic string is located, the current of the branch where the pole switch is located, and the current of the branch where the photovoltaic string is located and the current of the branch where the pole switch is located.

Exemplarily, referring to FIG. 11*b* (1), in a normal case, the current value of the branch where each photovoltaic string is located is the output current of the photovoltaic string when operating normally, the current value of the branch where the positive switch SX1 is located is the sum of the output current of the photovoltaic string PV1 and the output current of the photovoltaic string PV2, the current value of the branch where the positive switch SX2 is located is the sum of the output current of the photovoltaic string PV3 and the output current of the photovoltaic string PV4, and the current value of the branch where the positive switch SX3 is located is the output current of the photovoltaic string PV5.

When the photovoltaic string PV1 is short-circuited or reversely connected, referring to FIG. 11*b* (2), the output current of each of the photovoltaic strings PV2, PV3, PV4 and PV5 is reversely poured to the photovoltaic string PV1, so that the current of the branch where the photovoltaic string PV1 is located is increased to four times the short-circuit current or reverse connection current of a single photovoltaic string. In addition, a value of a current flowing through the branch where the positive switch SX1 is located is a sum of the output currents of the photovoltaic string PV3, the photovoltaic string PV4, and the photovoltaic string PV5, and the current value increases. Therefore, in response to determining the absolute current value of the branch where the photovoltaic string PV1 is located to be greater than the first predetermined current threshold according to the first current value, or in response to determining the absolute current value of the branch where the positive switch SX1 is located to be greater than the second predetermined current threshold according to the second current information, or in response to determining the absolute current value of the branch where the photovoltaic string PV1 is located to be greater than the first predetermined current threshold according to the first current value and determining the absolute current value of the branch where the positive switch SX1 is located to be greater than the second predetermined current threshold according to the second current information, the fault in the photovoltaic power generation system can be determined.

In the above embodiments, based on the detected current, the fault in the photovoltaic power generation system can be simply and accurately detected.

In some embodiments, the parameter detection portion further includes a first voltage sensor. The first voltage sensor is configured to detect a voltage of the direct-current bus and transmit the voltage of the direct-current bus to the control portion.

For example, referring to FIG. 11*a* and FIG. 11*b*, a first voltage sensor 33 may be provided on the direct-current bus. In an exemplary embodiment of the present disclosure, the first voltage sensor 33 may be provided between the positive input terminal and the negative input terminal of the power conversion unit 10. The voltage of the direct-current bus may be detected by the first voltage sensor 33 and be transmitted to the control portion.

Further, the control portion is further configured to detect the fault in the photovoltaic power generation system when the voltage of the direct-current bus is smaller than a first predetermined voltage threshold.

That is, the control portion may determine the fault in the photovoltaic power generation system based on the voltage of the direct-current bus.

Exemplarily, referring to FIG. 11*b* (1), in a normal case, the voltage of the direct-current bus is a voltage after the five photovoltaic strings are connected in parallel. When the photovoltaic string PV1 is short-circuited or reversely connected, referring to FIG. 11*b* (2), the output current of each of the photovoltaic strings PV2, PV3, PV4 and PV5 is reversely poured to the photovoltaic string PV1 through the multi-pole linked switch 20. Moreover, there are few currents flowing through the direct-current bus, and the voltage of the direct-current bus is very small. Therefore, when it is determined that the voltage of the direct-current bus is smaller than the first predetermined voltage threshold, the fault in the photovoltaic power generation system is determined.

In the above embodiments, based on the detected voltage, the fault in the photovoltaic power generation system can be simply and accurately detected.

Further, the control portion is further configured to: detect the fault in the photovoltaic power generation system in response to determining an absolute current value of the branch where the photovoltaic string is located to be greater than a first predetermined current threshold and determining the voltage of the direct-current bus to be smaller than a first predetermined voltage threshold; or detect the fault in the photovoltaic power generation system in response to determining an absolute current value of the branch where the pole switch is located to be greater than a second predetermined current threshold and determining the voltage of the direct-current bus to be smaller than the first predetermined voltage threshold.

That is, the control portion may determine the fault in the photovoltaic power generation system based on the current of the branch where the photovoltaic string is located and the voltage of the direct-current bus, or based on the current of the branch where the pole switch is located and t the voltage of the direct-current bus.

Exemplarily, referring to FIG. 11*b* (1), in a normal case, the current value of the branch where each photovoltaic string is located is the output current of the photovoltaic string when operating normally, the current value of the branch where the positive switch SX1 is located is the sum of the output currents of the photovoltaic string PV1 and the photovoltaic string PV2, the current value of the branch where the positive switch SX2 is located is the sum of the output currents of the photovoltaic string PV3 and the photovoltaic string PV4, the current value of the branch where the positive switch SX3 is located is the output current of the photovoltaic string PV5, and the voltage of the direct-current bus is the voltage after the five photovoltaic strings are connected in parallel.

When the photovoltaic string PV1 is short-circuited or reversely connected, referring to FIG. 11*b* (2), the output current of each of the photovoltaic strings PV2, PV3, PV4 and PV5 is reversely poured to the photovoltaic string PV1, so that the current of the branch where the photovoltaic string PV1 is located is increased to four times the short-circuit current or reverse connection current of a single photovoltaic string. The value of the current flowing through the branch where the photovoltaic string PV1 is located is the sum of the output currents of the photovoltaic strings PV3, the PV4, and the PV5. The current value increases, but there are few currents flowing through the direct-current bus, and the voltage of the direct-current bus is very small. Therefore, in response to determining the absolute current value of the branch where the photovoltaic string PV1 is located to be greater than the first predetermined current threshold and determining the voltage of the direct-current bus to be smaller than the first predetermined voltage threshold, or in response to determining the absolute current value of the branch where the positive switch SX1 is located to be greater than the second predetermined current threshold and determining the voltage of the direct-current bus to be smaller than the first predetermined voltage threshold, the fault in the photovoltaic power generation system is determined.

In the above embodiments, based on the detected current and the detected voltage, the fault in the photovoltaic power generation system can be simply and accurately detected.

In some embodiments, the parameter detection portion further includes a third current sensor. The third current sensor is configured to detect current information of the direct-current bus and transmit the current information of the direct-current bus to the control portion.

For example, referring to FIG. 11*a* and FIG. 11*b*, a third current sensor 34 may be provided on the direct-current bus. In an exemplary embodiment of the present disclosure, the third current sensor 34 may be provided on a positive direct-current bus. The current information of the direct-current bus may be detected by the third current sensor 34, include the current value, and be transmitted to the control portion.

Further, the control portion is further configured to: determine an absolute current value of a branch where any photovoltaic string is located according to the first current information, determine an absolute current value of the direct-current bus according to the current information of the direct-current bus, and detect the fault in the photovoltaic power generation system in response to determining the absolute current value of the branch where any photovoltaic string is located to be greater than the absolute current value of the direct-current bus; or determine an absolute current value of a branch where any pole switch is located according to the second current information, determine the absolute current value of the direct-current bus according to the current information of the direct-current bus, and detect the fault in the photovoltaic power generation system in response to determining the absolute current value of the branch where any pole switch is located to be greater than the absolute current value of the direct-current bus; or determine the absolute current value of the branch where any photovoltaic string is located according to the first current information, determine the absolute current value of the direct-current bus according to the current information of the direct-current bus, determine the absolute current value of the branch where any pole switch is located according to the second current information, and detect the fault in the photovoltaic power generation system in response to determining the absolute current value of the branch where any photovoltaic string is located to be greater than the absolute current value of the direct-current bus and determining the absolute current value of the branch where any pole switch is located to be greater than the absolute current value of the direct-current bus.

That is, the control portion determines the fault in the photovoltaic power generation system based on a relationship between the current of the branch where the photovoltaic string is located and the current of the direct-current bus, or based on a relationship between the current of the branch where the pole switch is located and the current of the direct-current bus, or based on the relationship between the current of the branch where the photovoltaic string is located and the current of the direct-current bus and the relationship between the current of the branch where the pole switch is located and the current of the direct-current bus.

Exemplarily, referring to FIG. 11*b* (1), in a normal case, the current value of the branch where each photovoltaic string is located is the output current of the photovoltaic string when operating normally, the current of the branch where each pole switch is located is the sum of the output currents of the photovoltaic strings connected thereto or the output current of the photovoltaic string connected thereto, and the current value of the direct-current bus is the sum of the output currents of the five photovoltaic strings. When the photovoltaic string PV1 is short-circuited or reversely connected, referring to FIG. 11*b* (2), the output current of each of the photovoltaic strings PV2, PV3, PV4 and PV5 is reversely poured to the photovoltaic string PV1, the current of each photovoltaic string and the current of the branch where each pole switch is located is at least one time the output current of the photovoltaic string, but only little current flows through the direct-current bus, and the current is smaller than one time the output current of the photovoltaic string. Therefore, in response to determining that the absolute current value of the branch where each photovoltaic string is located is greater than the absolute current value of the direct-current bus based on the first current information, or determining that the absolute current value of the branch where each pole switch is located is greater than the absolute current value of the direct-current bus based on the second current information, or determining that the absolute current value of the branch where each photovoltaic string is located is greater than the absolute current value of the direct-current bus based on the first current information and determining that the absolute current value of the branch where each pole switch is located is greater than the absolute current value of the direct-current bus based on the second current information, the fault in the photovoltaic power generation system is determined.

In the above embodiments, based on the detected current and the detected voltage, the fault in the photovoltaic power generation system can be simply and accurately detected.

It should be noted that, as described above, the control portion determines the fault in the photovoltaic power generation system and determines whether to control the multi-pole linked switch to be disconnected on the basis of the illumination intensity or the current value, which are mainly described by the system structure illustrated in FIG. 11*a* and FIG. 11*b*. However, this cannot be used as a limitation on these manners, and these manners are applicable to all system structures involved in the present disclosure, and its details will not be described herein.

In conclusion, with the fault protection device for the photovoltaic power generation system according to the embodiments of the present disclosure, in the case where the fault occurs in the photovoltaic power generation system, the positive input terminal and the negative input terminal of the power conversion unit are short-circuited by controlling the switch tube in the power conversion unit, which can lower the current flowing through the multi-pole linked switch and improve the safety of the multi-pole linked switch during disconnection, enabling the multi-pole linked switch to disconnect and isolate the fault more safely and reliably. After the multi-pole linked switch is disconnected, there are at most three of the N photovoltaic strings connected in parallel, which can improve the safety of the photovoltaic string.

Figure 12:
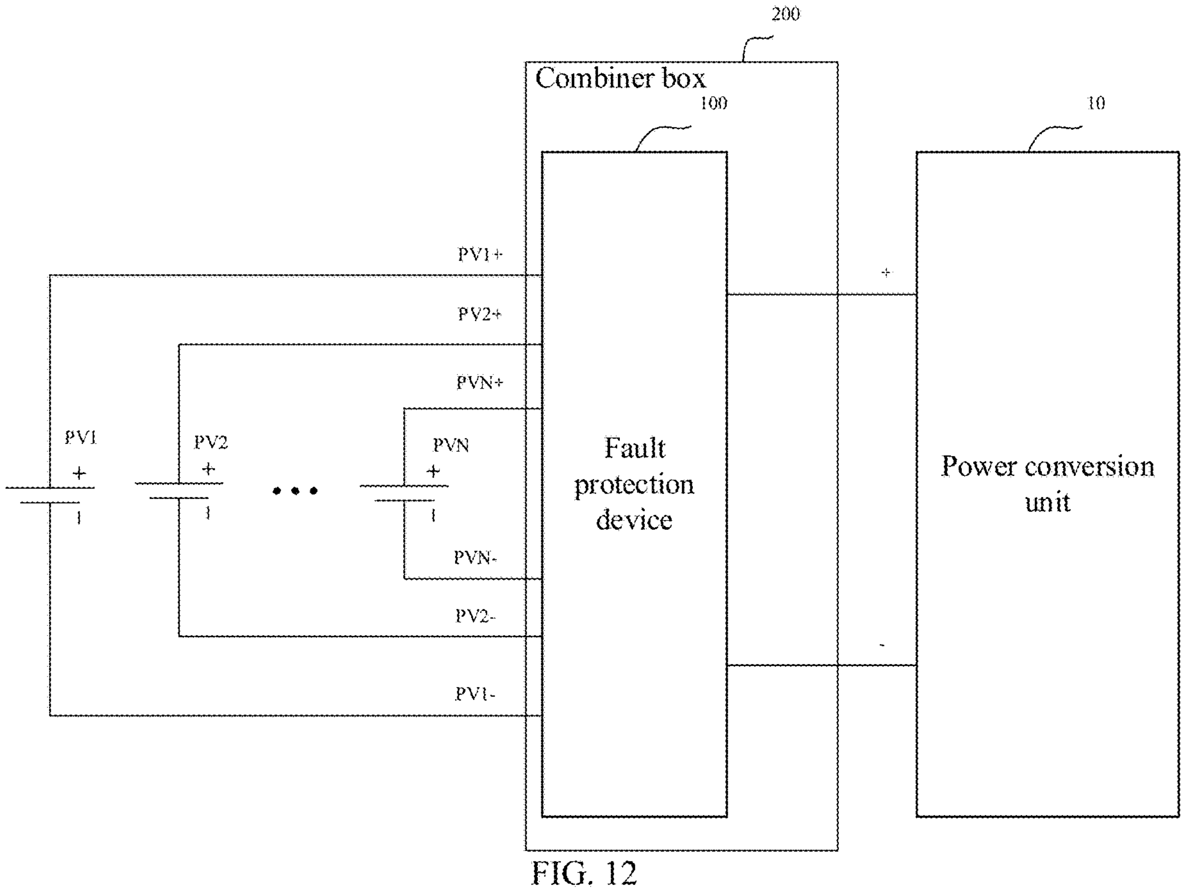
FIG. 12 is a schematic structural diagram of a combiner box according to an embodiment of the present disclosure.

In some embodiments, further provided is a combiner box 200. Referring to FIG. 12, the combiner box 200 may include the foregoing fault protection device 100. The fault protection device 100 is configured to, in response to the fault in the photovoltaic power generation system, short-circuit a positive input terminal and a negative input terminal of a power conversion unit 10 and disconnect the N photovoltaic strings PV1, PV2, . . . , PVN and the power conversion unit 10, such that at most three of the N photovoltaic strings PV1, PV2, . . . , PVN are connected in parallel.

It should be noted that, in some examples, the combiner box 200 may also include a power conversion unit 10. The power conversion unit 10 may be, but is not limited to, a DC/DC converter. For the related description of the fault protection device 100, reference can be made to the foregoing descriptions, and its details will not be described herein.

With the combiner box according to the embodiments of the present disclosure, based on the foregoing fault protection device, in the case where the fault occurs in the photovoltaic power generation system, the positive input terminal and the negative input terminal of the power conversion unit are short-circuited by controlling the switch tube in the power conversion unit, which can lower the current flowing through the multi-pole linked switch and improve the safety of the multi-pole linked switch during disconnection, enabling the multi-pole linked switch to disconnect and isolate the fault more safely and reliably. After the multi-pole linked switch is disconnected, there are at most three of the N photovoltaic strings connected in parallel, which can improve the safety of the photovoltaic string.

Figure 13:
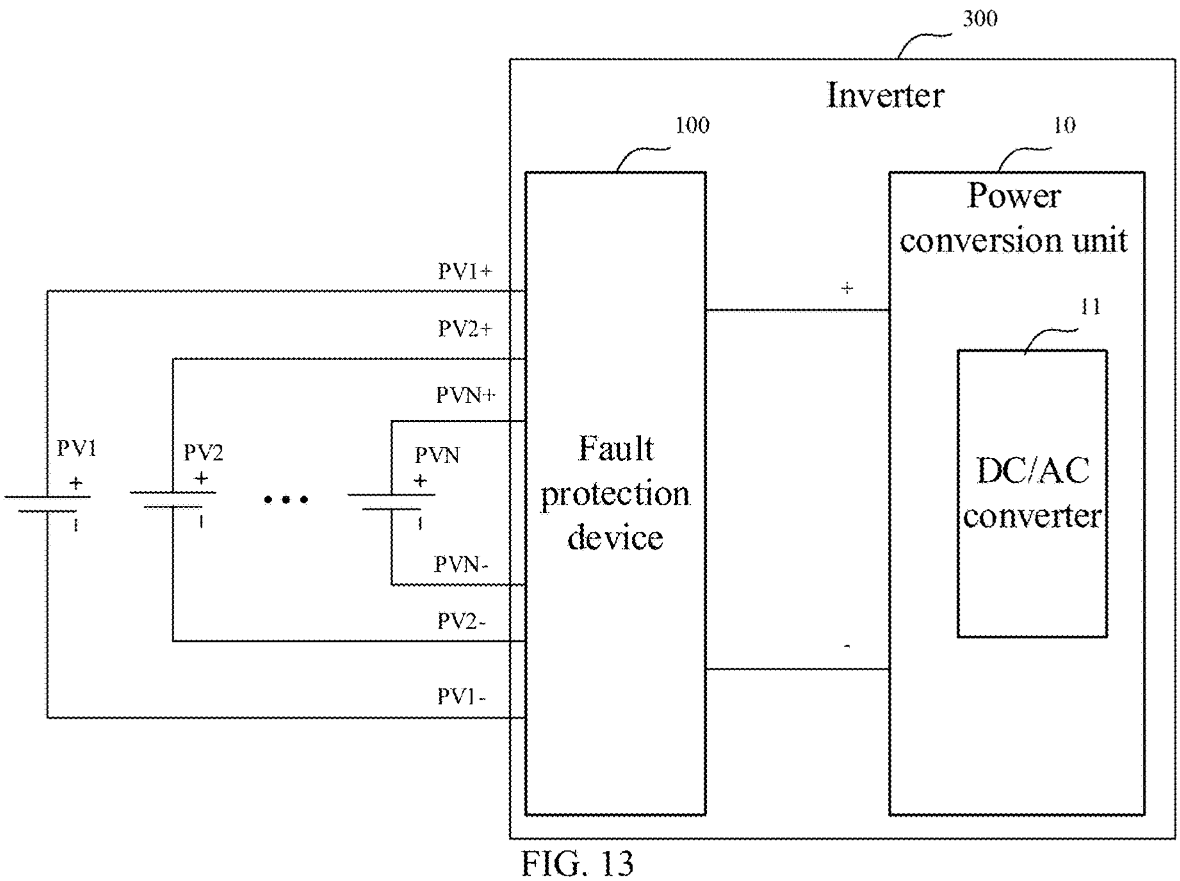
FIG. 13 is a schematic structural diagram of an inverter according to an embodiment of the present disclosure.

In some embodiments, further provided is an inverter 300. Referring to FIG. 13, the inverter 300 may include: the foregoing fault protection device 100 and the power conversion unit 10. The power conversion unit 10 includes a DC/AC converter 11 and is configured to convert a direct-current outputted by the N photovoltaic strings PV1, PV2, PVN and output an alternating current through the DC/AC converter 11. The fault protection device 100 is configured to, in response to the fault in the photovoltaic power generation system, short-circuit a positive input terminal and a negative input terminal of the power conversion unit 10 and disconnect the N photovoltaic strings PV1, PV2, . . . , PVN and the power conversion unit 10, such that at most three of the N photovoltaic strings PV1, PV2, . . . , PVN are connected in parallel.

It should be noted that, in some examples, referring to FIG. 13, the power conversion unit 10 may include a DC/AC converter 11, or the power conversion unit 10 includes a DC/DC converter and a DC/AC converter 11. For the related description of the fault protection device 100, reference can be made to the foregoing descriptions, and its details will not be described herein.

With the inverter according to the embodiments of the present disclosure, based on the foregoing fault protection device, in the case where the fault occurs in the photovoltaic power generation system, the positive input terminal and the negative input terminal of the power conversion unit are short-circuited by controlling the switch tube in the power conversion unit, which can lower the current flowing through the multi-pole linked switch and improve the safety of the multi-pole linked switch during disconnection, enabling the multi-pole linked switch to disconnect and isolate the fault more safely and reliably. After the multi-pole linked switch is disconnected, there are at most three of the N photovoltaic strings connected in parallel, which can improve the safety of the photovoltaic string.

Figure 14:
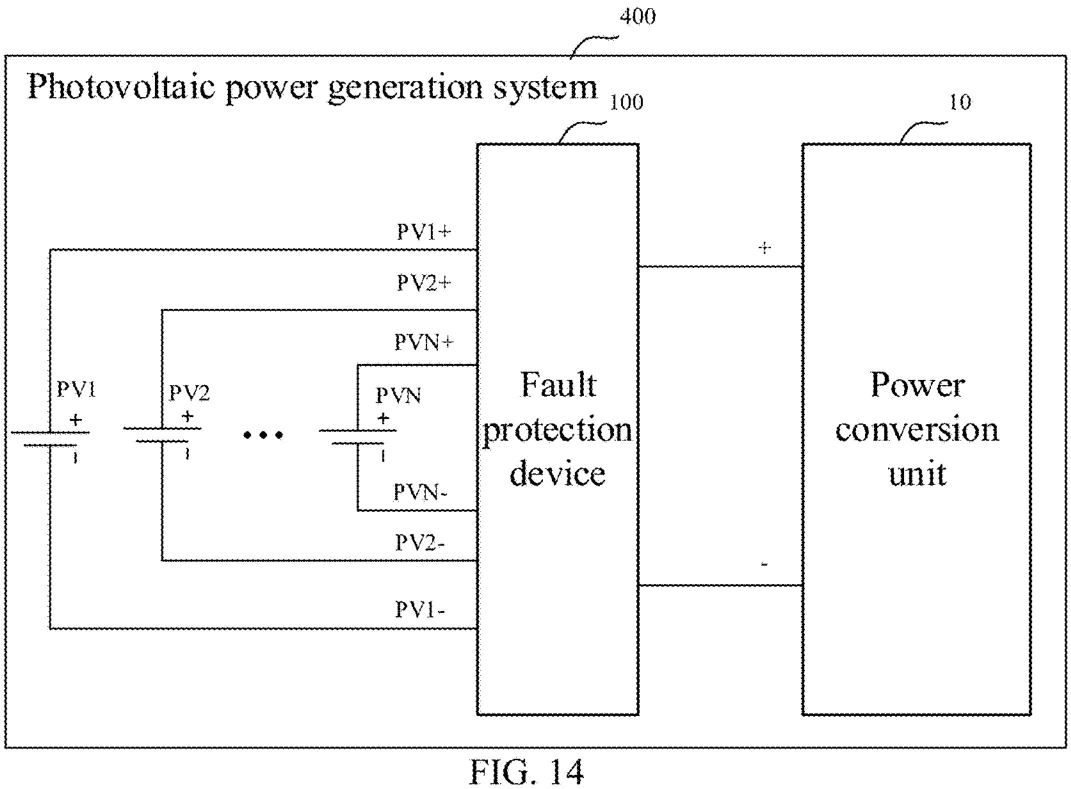
FIG. 14 is a schematic structural diagram of a photovoltaic power generation system according to an embodiment of the present disclosure.

In some embodiments, further provided is a photovoltaic power generation system 400. Referring to FIG. 14, the photovoltaic power generation system 400 includes the foregoing fault protection device 100 and other components. For example, the photovoltaic power generation system 400 further includes N photovoltaic strings PV1, PV2, . . . , PVN, the power conversion unit 10, and the like. The fault protection device 100 may be configured to short-circuit the positive input terminal and the negative input terminal of the power conversion unit 10 in the case where the fault occurs in the photovoltaic power generation system 400 and disconnect the N photovoltaic strings PV1, PV2, . . . , PVN and the power conversion unit 10, such that at most three of the N photovoltaic strings PV1, PV2, . . . , PVN are connected in parallel.

As described above, the fault protection device 100 may include a multi-pole linked switch 20 and a control portion. The multi-pole linked switch 20 is controlled to be disconnected by the control portion, such that the N photovoltaic strings PV1, PV2, . . . , PVN and the power conversion unit 10 can be disconnected, enabling at most three of the N photovoltaic strings PV1, PV2, . . . , PVN to be connected in parallel.

It should be noted that, the foregoing examples are described by taking one multi-pole linked switch 20 as an example. However, in some embodiments, two or more multi-pole linked switches 20 may be provided. For example, with reference to FIG. 15, there are six multi-pole linked switches 20 (only two are illustrated in the drawings exemplarily).

In some embodiments, when the fault protection device 100 includes a plurality of multi-pole linked switches 20, each of the plurality of multi-pole linked switches 20 is connected in parallel to a positive input terminal and a negative input terminal of the power conversion unit 10. The control portion is further configured to determine a fault type of the photovoltaic power generation system 400 and control part or all of the plurality of multi-pole linked switches 20 to be disconnected according to the fault type of the photovoltaic power generation system 400.

In an exemplary embodiment of the present disclosure, the disconnection of part or all of the plurality of multi-pole linked switches 20 means that only a part of the plurality of multi-pole linked switches 20 may be disconnected, or all of the multi-pole linked switches 20 may be disconnected, which can be determined based on a fault detection result and actual requirements specifically.

For example, based on the safety consideration of the photovoltaic power generation system 400, when the fault in the photovoltaic power generation system 400 is detected, all of the plurality of multi-pole linked switches 20 are controlled to be disconnected; and based on power supply reliability of the photovoltaic power generation system 400, when the fault in the photovoltaic power generation system 400 is detected, part of the plurality of protection switches 20 are controlled to be disconnected based on the fault detection result, and the rest of the plurality of protection switches 20 are maintained in a current state. In this way, the photovoltaic power generation system 400 is allowed to continue to supply power. Therefore, reliability of power supply is ensured.

When part of the plurality of protection switches 20 are controlled to be disconnected based on the fault detection result, there are various cases. For example, without considering the cost, the first current sensor may be provided at the positive electrode and the negative electrode of each photovoltaic string, and the photovoltaic string with a reverse connection fault or a short-circuit fault may be detected through the first current sensor, so as to control the multi-pole linked switch 20 corresponding to the photovoltaic string to be disconnected.

In a case of considering costs and the like, only the first current sensor may be provided at the positive electrode of each photovoltaic string, but the photovoltaic string with the short-circuit fault cannot be detected on the basis of the first current sensor only being able to detect the photovoltaic string with the reverse connection fault. In this case, a reverse connection fault or a short-circuit fault in the photovoltaic power generation system 400 can be first determined, and exemplarily, based on a voltage. For example, when a reverse connection fault occurs, the pole switch corresponding to the photovoltaic string bears two times the reverse connection voltage of a single photovoltaic string. On the basis of the voltage, a reverse connection fault in the photovoltaic power generation system 400 is detected. When a reverse connection fault in the photovoltaic power generation system 400 is determined, the photovoltaic string with the reverse connection fault can be determined based on the current detected by the first current sensor, and then the multi-pole linked switch 20 corresponding to the photovoltaic string is controlled to be disconnected. When a short-circuit fault in the photovoltaic power generation system 400 is determined, since the photovoltaic string with a short-circuit fault cannot be determined based on the current detected by the first current sensor, all of the plurality of multi-pole linked switches 20 need to be controlled to be disconnected. For example, referring to FIG. 15, when a positive electrode PV1+ of the photovoltaic string PV1 is grounded, since a current of a negative electrode PV1− of the photovoltaic string PV1 cannot be detected, it cannot be determined that whether the negative electrode PV1-ground of the photovoltaic string PV1 is grounded. It may be that the negative electrode PV1-ground of the photovoltaic string PV1 is grounded, or other photovoltaic strings such as a negative electrode PV26− of a photovoltaic string PV26 is grounded. In this way, it is impossible to determine which photovoltaic string is grounded to cause a short-circuit fault of the photovoltaic string. Therefore, it is necessary to control all of the plurality of multi-pole linked switches 20 to be disconnected.

In this way, some of the photovoltaic strings of the system may continue to supply the generated power to the power conversion unit through the multi-pole linked switch in some faulty cases, so that the photovoltaic power generation system may continue to be used.

In some embodiments, the control portion is further configured to control a multi-pole linked switch 20 of the plurality of multi-pole linked switches 20 that corresponds to a reverse connection branch to be disconnected when the fault type of the photovoltaic power generation system 400 is a reverse connection fault. That is, when the fault type is the reverse connection fault, it is allowed that some of the photovoltaic strings continue to supply the generated power to the power conversion unit 10, such that the photovoltaic power generation system 400 may continue to be used.

Figure 15:
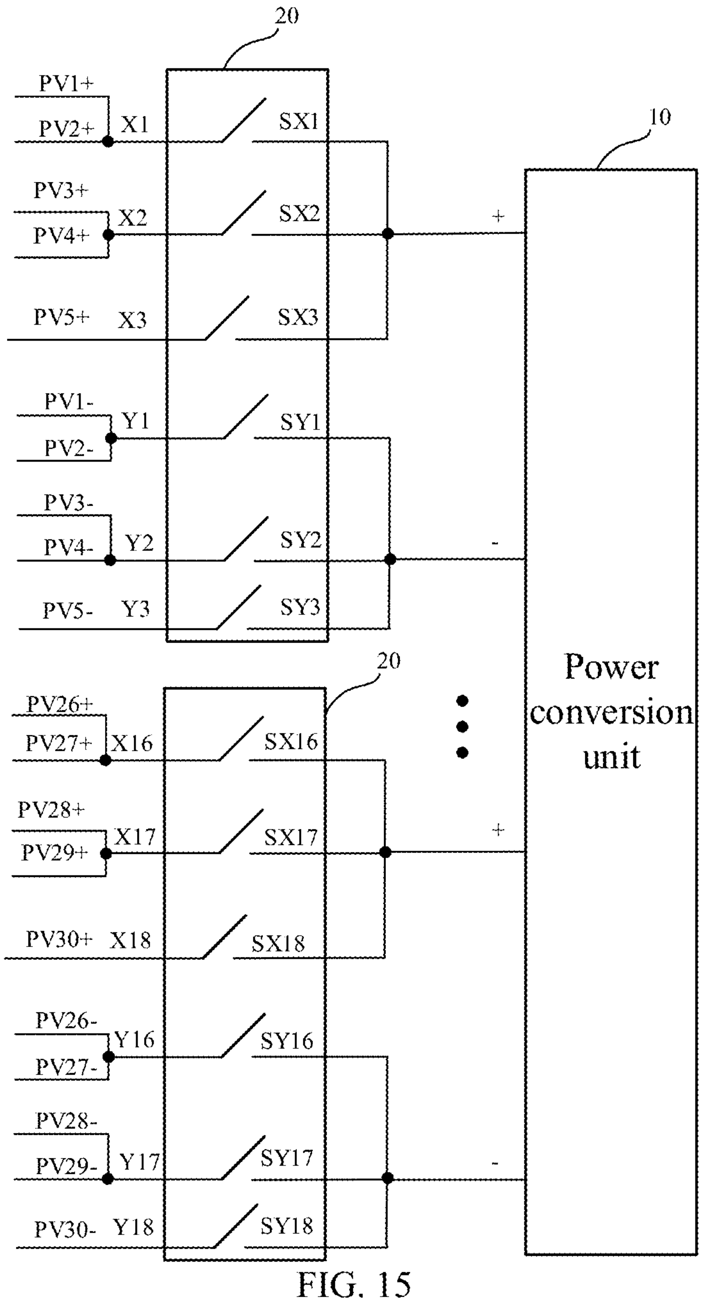
FIG. 15 is a schematic structural diagram of a photovoltaic power generation system according to another embodiment of the present disclosure.

Exemplarily, referring to FIG. 15, when a reverse connection fault in the photovoltaic string PV1 is determined, a reverse connection fault in the photovoltaic power generation system 400 can be determined based on the voltage of the positive switch SX1 corresponding to the photovoltaic string PV1. At this time, the multi-pole linked switch 20 corresponding to the photovoltaic string PV1 is controlled by the control portion to be disconnected, while the rest of multi-pole linked switches 20 corresponding to the photovoltaic strings without faults do operate normally, and continue to supply the generated power to the power conversion unit 10, such that the photovoltaic power generation system 400 may continue to be used.

In the above embodiments, when a reverse connection fault occurs in the photovoltaic power generation system, the multi-pole linked switch corresponding to the reverse connection branch is controlled to be disconnected, and the rest of multi-pole linked switches continue to operate, such that part of the photovoltaic strings continue to supply the generated power to the power conversion unit, enabling the photovoltaic power generation system to continue to be used.

In some embodiments, the control portion is further configured to control all of the plurality of multi-pole linked switches 20 to be disconnected when the fault type of the photovoltaic power generation system is a short-circuit fault. That is, when the fault type is the short-circuit fault, since the photovoltaic string with a short-circuit fault is difficult to be identified, all of the plurality of multi-pole linked switches 20 are controlled to be disconnected when a short-circuit fault occurs, so as to improve the safety of the photovoltaic power generation system 400.

In some embodiments, the power conversion unit 10 includes at least one of a DC/DC converter and a DC/AC converter. For example, the power conversion unit 10 may include a DC/DC converter, or a DC/AC converter, or a DC/DC converter and a DC/AC converter.

Figure 16:
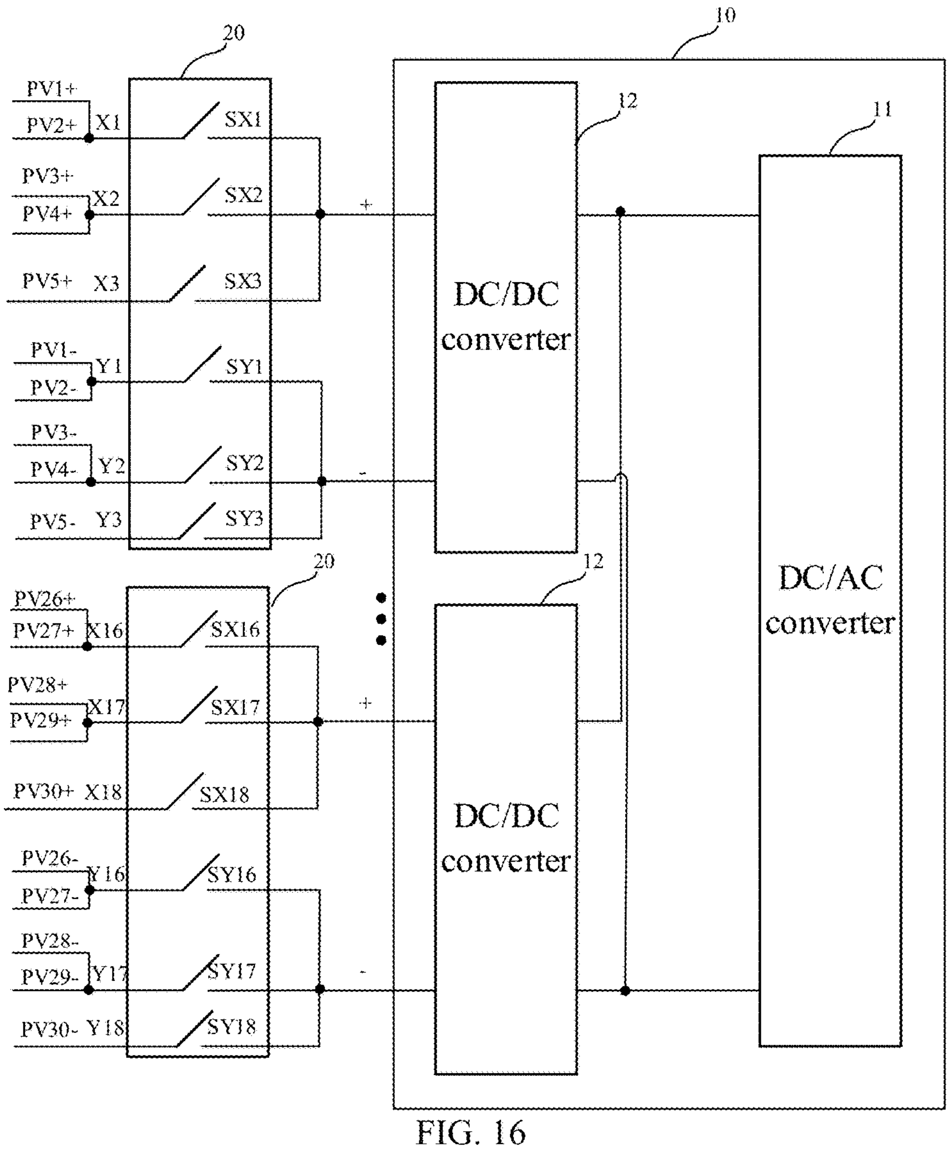
FIG. 16 is a schematic structural diagram of a photovoltaic power generation system according to yet another embodiment of the present disclosure.

In some embodiments, referring to FIG. 16, when the power conversion unit 10 includes a DC/DC converter 12 and a DC/AC converter 11, a positive input terminal of the DC/DC converter 12 serves as the positive input terminal of the power conversion unit 10, a negative input terminal of the DC/DC converter 12 serves as the negative input terminal of the power conversion unit 10, and an output terminal of the DC/DC converter 12 is connected to an input terminal of the DC/AC converter 11.

Further, referring to FIG. 16, when there are a plurality of multi-pole linked switches 20, there are a plurality of DC/DC converters 12. Each of DC/DC converters 12 has an input terminal connected to the corresponding multi-pole linked switch 20, and the plurality of DC/DC converters 12 have output terminals respectively connected in parallel to the input terminal of the DC/AC converter 11.

Figure 17:
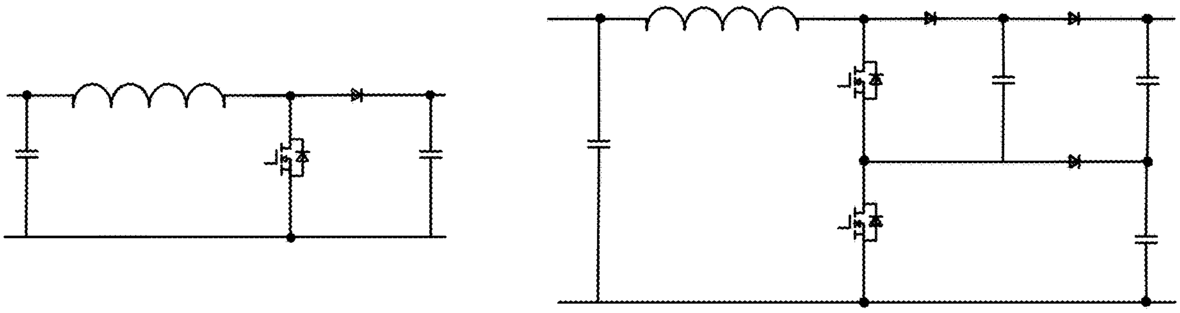
FIG. 17 is a schematic structural diagram of a DC/DC converter according to some embodiments of the present disclosure.
Figure 18:
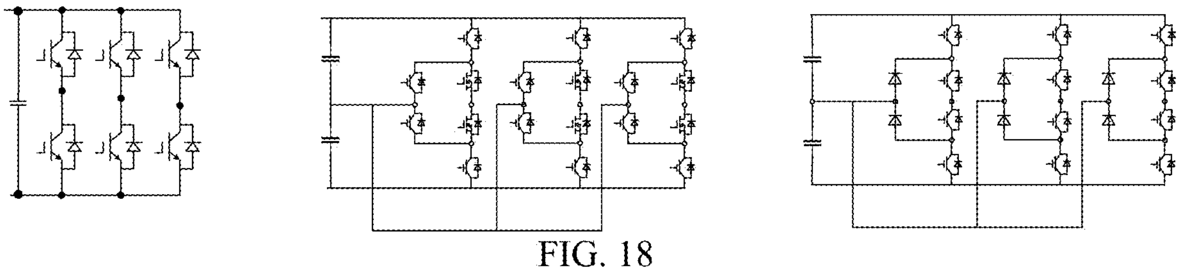
FIG. 18 is a schematic structural diagram of a DC/AC converter according to some embodiments of the present disclosure.

Exemplarily, FIG. 17 provides two kinds of DC/DC converters, and FIG. 18 provides three kinds of DC/AC converters. However, this is merely an exemplary description and is not intended as a limitation on the present disclosure.

With the photovoltaic power generation system according to the embodiments of the present disclosure, based on the foregoing fault protection device, in the case where the fault occurs in the photovoltaic power generation system, the positive input terminal and the negative input terminal of the power conversion unit are short-circuited by controlling the switch tube in the power conversion unit, which can lower the current flowing through the multi-pole linked switch and improve the safety of the multi-pole linked switch during disconnection, enabling the multi-pole linked switch to disconnect and isolate the fault more safely and reliably. After the multi-pole linked switch is disconnected, there are at most three of the N photovoltaic strings connected in parallel, which can improve the safety of the photovoltaic string. When there are a plurality of multi-pole linked switches, part or all of the multi-pole linked switches may be controlled to be disconnected based on the fault type, so that in some cases, the photovoltaic power generation system can be used.

In some embodiments, a fault protection method is also provided. The fault protection method may include: controlling, in response to a fault in the photovoltaic power generation system, a switch tube in the power conversion unit to short-circuit the positive input terminal and the negative input terminal of the power conversion unit, and controlling the multi-pole linked switch to be disconnected, such that at most three of the N photovoltaic strings are connected in parallel.

In some embodiments, the fault protection method further includes, subsequent to short-circuiting the positive input terminal and the negative input terminal of the power conversion unit: controlling the multi-pole linked switch to be disconnected. In this way, by short-circuiting the positive input terminal and the negative input terminal of the power conversion unit, the current flowing through the multi-pole linked switch can be reduced, and the safety of the multi-pole linked switch during disconnection is improved, enabling the multi-pole linked switch to disconnect and isolate the fault more safely and reliably.

In some embodiments, the fault protection method further includes, subsequent to short-circuiting the positive input terminal and the negative input terminal of the power conversion unit: obtaining at least one of a current value of a branch where each photovoltaic string is located, a current value of a branch where each pole switch is located, and a current value of a direct-current bus; and controlling the multi-pole linked switch to be disconnected in response to determining a power generation current of the photovoltaic power generation system to be smaller than a first predetermined value according to the at least one of the current value of the branch where each photovoltaic string is located, the current value of the branch where each pole switch is located, and the current value of the direct-current bus. In this way, after the positive input terminal and the negative input terminal of the power conversion unit are short-circuited, in a case where it is determined that the current flowing through the multi-pole linked switch is small, i.e., in a case where the current flowing through the multi-pole linked switch is small, the multi-pole linked switch is controlled to be disconnected, which can further improve the safety of the multi-pole linked switch during disconnection.

In some embodiments, the fault protection method further includes, subsequent to short-circuiting the positive input terminal and the negative input terminal of the power conversion unit: obtaining an illumination intensity and controlling the multi-pole linked switch to be disconnected in response to the illumination intensity being smaller than a predetermined intensity. The illumination intensity is small, the power generation current of the corresponding photovoltaic power generation system is small. Moreover, the current flowing through the multi-electrode linked switch is small after the positive input terminal and the negative input terminal of the power conversion unit are short-circuited. Therefore, the safety of the multi-pole linked switch during disconnection can be further improved.

In some embodiments, the fault protection method further includes: detecting at least one of a parameter value of a branch where each photovoltaic string is located, a parameter value of a branch where each pole switch is located, and a parameter value of a direct-current bus; and determining the fault in the photovoltaic power generation system according to the at least one of the parameter value of the branch where each photovoltaic string is located, the parameter value of the branch where each pole switch is located, and the parameter value of the direct-current bus. In this way, the fault in the photovoltaic power generation system can be simply and accurately detected by detecting one or more of the parameter value of the branch where the photovoltaic string is located, the parameter value of the parameter value of the branch where the photovoltaic string is located, the parameter value of the branch where the pole switch is located, and the parameter value of the direct-current bus.

In some embodiments, the parameter value of the branch where each photovoltaic string is located includes first current information; and the parameter value of the branch where each pole switch is located includes second current information. The fault protection method further includes: detecting the fault in the photovoltaic power generation system in response to determining a current direction of the branch where the photovoltaic string is located to be opposite to a predetermined direction according to the first current information; or determining the fault in the photovoltaic power generation system in response to determining a current direction of the branch where the pole switch is located to be opposite to a predetermined direction according to the second current information; or determining the fault in the photovoltaic power generation system in response to determining the current direction of the branch where the photovoltaic string is located to be opposite to the predetermined direction according to the first current information and determining the current direction of the branch where the pole switch is located to be opposite to the predetermined direction according to the second current information. In this way, based on the detected current direction, the fault in the photovoltaic power generation system can be simply and accurately detected.

In some embodiments, the parameter value of the branch where each photovoltaic string is located includes first current information, and the parameter value of the branch where each pole switch is located includes second current information. The fault protection method further includes: determining the fault in the photovoltaic power generation system in response to determining an absolute current value of the branch where the photovoltaic string is located to be greater than a first predetermined current threshold according to the first current information; or determining the fault in the photovoltaic power generation in response to determining an absolute current value of the branch where the pole switch is located to be greater than a second predetermined current threshold according to the second current information; or determining the fault in the photovoltaic power generation in response to determining the absolute current value of the branch where each photovoltaic string is located to be greater than the first predetermined current threshold according to the first current information and determining the absolute current value of the branch where each pole switch is located to be greater than the second predetermined current threshold according to the second current information. In this way, based on the detected current, the fault in the photovoltaic power generation system can be simply and accurately detected.

In some embodiments, the parameter value of the branch where each photovoltaic string is located includes first current information, and the parameter value of the direct-current bus includes a voltage of the direct-current bus. The fault protection method further includes: determining the fault in the photovoltaic power generation in response to determining an absolute current value of the branch where the photovoltaic string is located to be greater than a first predetermined current threshold according to the first current information and determining the voltage of the direct-current bus to be smaller than a first predetermined voltage threshold. In this way, based on the detected current and detected voltage, the fault in the photovoltaic power generation system can be simply and accurately detected.

In some embodiments, the parameter value of the branch where each pole switch is located includes second current information, and the parameter value of the direct-current bus includes a voltage of the direct-current bus. The fault protection method further includes: determining the fault in the photovoltaic power generation in response to determining the absolute current value of the pole switch is located to be greater than a second predetermined current threshold according to the second current information and determining the voltage of the direct-current bus to be smaller than a first predetermined voltage threshold. In this way, based on the detected current and detected voltage, the fault in the photovoltaic power generation system can be simply and accurately detected.

In some embodiments, the parameter value of the direct-current bus includes a voltage of the direct-current bus. The fault protection method further includes: determining the fault in the photovoltaic power generation in response to the voltage of the direct-current bus being smaller than a first predetermined voltage threshold. In this way, based on the detected voltage, the fault in the photovoltaic power generation system can be simply and accurately detected.

In some embodiments, the parameter value of the branch where each photovoltaic string is located includes first current information, the parameter value of the branch where each pole switch is located includes second current information, and the parameter value of the direct-current bus includes current information of the direct-current bus. The fault protection method further includes: determining an absolute current value of a branch where any photovoltaic string is located according to the first current information, determining an absolute current value of the direct-current bus according to the current information of the direct-current bus, and determining the fault in the photovoltaic power generation in response to determining the absolute current value of the branch where any photovoltaic string is located to be greater than the absolute current value of the direct-current bus; or determining an absolute current value of a branch where any pole switch is located according to the second current information, determining the absolute current value of the direct-current bus according to the current information of the direct-current bus, and determining the fault in the photovoltaic power generation in response to determining the absolute current value of the branch where any pole switch is located to be greater than the absolute current value of the direct-current bus; or determining the absolute current value of the branch where any photovoltaic string is located according to the first current information, determining the absolute current value of the direct-current bus according to the current information of the direct-current bus, determining the absolute current value of the branch where any pole switch is located according to the second current information, and determining the fault in the photovoltaic power generation in response to determining the absolute current value of the branch where any photovoltaic string is located to be greater than the absolute current value of the direct-current bus and determining the absolute current value of the branch where any pole switch is located to be greater than the absolute current value of the direct-current bus. In this way, based on the detected current, the fault in the photovoltaic power generation system can be simply and accurately detected.

It should be noted that, with regard to the related description of the fault protection method, please refer to the foregoing description about the fault protection device, and its details will not be described herein.

With the fault protection method for the photovoltaic power generation system according to the embodiments of the present disclosure, in the case where the fault occurs in the photovoltaic power generation system, the positive input terminal and the negative input terminal of the power conversion unit are short-circuited by controlling the switch tube in the power conversion unit, which can lower the current flowing through the multi-pole linked switch and improve the safety of the multi-pole linked switch during disconnection, enabling the multi-pole linked switch to disconnect and isolate the fault more safely and reliably; and after the multi-pole linked switch is disconnected, there are at most three of the N photovoltaic strings connected in parallel, such that the safety of the photovoltaic string can be improved.

It should be noted that the logic and/or step described in other manners herein or illustrated in the flowchart, for example, a particular sequence table of executable instructions for realizing the logical function, may be exemplarily realized in any computer readable medium to be used by the instruction execution system, device or equipment (such as the system based on computers, the system including processors or other systems capable of obtaining the instructions from the instruction execution system, device and equipment and executing the instructions), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer disk case (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of being printed with programs thereon, this is because, for example, the paper or other appropriate medium may be optically scanned and then edited, decrypted or processed with other appropriate methods when necessary to obtain the programs in an electric manner, and then the programs may be stored in the computer memory.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

In the description of this specification, descriptions with reference to the terms "an embodiment", "some embodiments", "examples", "specific examples", or "some examples" etc., mean that specific features, structure, materials or characteristics described in conjunction with the embodiment or example are included in at least one embodiment or example of the present disclosure. In this specification, the schematic representations of the above terms do not necessarily refer to the same embodiment or example. Moreover, the described specific features, structures, materials or characteristics may be combined in any one or more embodiments or examples in a suitable manner.

In addition, the terms "first" and "second" are only used for descriptive purposes, and cannot be understood as indicating or implying relative importance or implicitly indicating the number of indicated technical features. Therefore, the features associated with "first" and "second" may explicitly or implicitly include at least one of the features. In the description of the present disclosure, "plurality of" means at least two, such as two, three, etc., unless otherwise exemplarily defined.

In the present disclosure, unless otherwise clearly specified and limited, terms such as "install", "connect", "connect to", "fix" and the like should be understood in a broad sense. For example, it may be a fixed connection or a detachable connection or connection as one piece; mechanical connection or electrical connection; direct connection or indirect connection through an intermediate; internal communication of two components or the interaction relationship between two components. For those skilled in the art, the specific meaning of the above-mentioned terms in the present disclosure can be understood according to specific circumstances.

Although the configurations of embodiments of the present disclosure have been shown and described, it would be appreciated by those skilled in the art that the above embodiments are exemplary and cannot be construed as limiting the present disclosure, and changes, modifications, substitutions, and variations can be made by those skilled in the art to the embodiments without departing from the scope of the present disclosure.

What is claimed is:

1. A fault protection method for a photovoltaic power generation system, the photovoltaic power generation system comprising a power conversion unit, a multi-pole linked switch, N photovoltaic strings, and positive connection terminals and negative connection terminals that are adapted to connect the N photovoltaic strings, wherein each pole switch in the multi-pole linked switch has a first terminal connected to one of the positive connection terminals or the negative connection terminals and a second terminal adapted to be connected to a positive input terminal or a negative input terminal of the power conversion unit, where N is an integer greater than or equal to 3, the fault protection method comprising:

controlling, in response to a fault in the photovoltaic power generation system, a switch tube in the power conversion unit to short-circuit the positive input terminal and the negative input terminal of the power conversion unit, and controlling the multi-pole linked switch to be disconnected, such that at most three of the N photovoltaic strings are connected in parallel, wherein the fault protection method further comprises, subsequent to short-circuiting the positive input terminal and the negative input terminal of the power conversion unit:

obtaining at least one of a current value of a branch where each photovoltaic string is located, a current value of a branch where each pole switch is located, and a current value of a direct-current bus; and controlling the multi-pole linked switch to be disconnected in response to determining a power generation current of the photovoltaic power generation system to be smaller than a first predetermined value according to the at least one of the current value of the branch where each photovoltaic string is located, the current value of the branch where each pole switch is located, and the current value of the direct-current bus.

2. The fault protection method according to claim 1, further comprising:

detecting at least one of a parameter value of a branch where each photovoltaic string is located, a parameter value of a branch where each pole switch is located, and a parameter value of a direct-current bus; and determining the fault in the photovoltaic power generation system according to the at least one of the parameter value of the branch where each photovoltaic string is located, the parameter value of the branch where each pole switch is located, and the parameter value of the direct-current bus.

3. The fault protection method according to claim 2, wherein the parameter value of the branch where each photovoltaic string is located comprises first current information; and the parameter value of the branch where each pole switch is located comprises second current information, the fault protection method further comprising:

detecting the fault in the photovoltaic power generation system in response to determining a current direction of the branch where the photovoltaic string is located to be opposite to a predetermined direction according to the first current information; or determining the fault in the photovoltaic power generation system in response to determining a current direction of the branch where the pole switch is located to be opposite to a predetermined direction according to the second current information; or determining the fault in the photovoltaic power generation system in response to determining the current direction of the branch where the photovoltaic string is located to be opposite to the predetermined direction according to the first current information and determining the current direction of the branch where the pole switch is located to be opposite to the predetermined direction according to the second current information; or determining the fault in the photovoltaic power generation system in response to determining an absolute current value of the branch where the photovoltaic string is located to be greater than a first predetermined current threshold according to the first current information; or determining the fault in the photovoltaic power generation in response to determining an absolute current value of the branch where the pole switch is located to be greater than a second predetermined current threshold according to the second current information; or determining the fault in the photovoltaic power generation in response to determining the absolute current value of the branch where each photovoltaic string is located to be greater than the first predetermined current threshold according to the first current information and determining the absolute current value of the branch where each pole switch is located to be greater than the second predetermined current threshold according to the second current information.

4. The fault protection method according to claim 2, wherein the parameter value of the branch where each photovoltaic string is located comprises first current information, and the parameter value of the direct-current bus comprises a voltage of the direct-current bus, the fault protection method further comprising:

determining the fault in the photovoltaic power generation in response to determining an absolute current value of the branch where the photovoltaic string is located to be greater than a first predetermined current threshold according to the first current information and determining the voltage of the direct-current bus to be smaller than a first predetermined voltage threshold.

5. The fault protection method according to claim 2, wherein the parameter value of the branch where each pole switch is located comprises second current information, and the parameter value of the direct-current bus comprises a voltage of the direct-current bus, the fault protection method further comprising:

determining the fault in the photovoltaic power generation in response to determining the absolute current value of the pole switch is located to be greater than a second predetermined current threshold according to the second current information and determining the voltage of the direct-current bus to be smaller than a first predetermined voltage threshold; or determining the fault in the photovoltaic power generation in response to the voltage of the direct-current bus being smaller than a first predetermined voltage threshold.

6. The fault protection method according to claim 2, wherein the parameter value of the branch where each photovoltaic string is located comprises first current information, the parameter value of the branch where each pole switch is located comprises second current information, and the parameter value of the direct-current bus comprises current information of the direct-current bus, the fault protection method further comprising:

determining an absolute current value of a branch where any photovoltaic string is located according to the first current information, determining an absolute current value of the direct-current bus according to the current information of the direct-current bus, and determining the fault in the photovoltaic power generation in response to determining the absolute current value of the branch where any photovoltaic string is located to be greater than the absolute current value of the direct-current bus; or determining an absolute current value of a branch where any pole switch is located according to the second current information, determining the absolute current value of the direct-current bus according to the current information of the direct-current bus, and determining the fault in the photovoltaic power generation in response to determining the absolute current value of the branch where any pole switch is located to be greater than the absolute current value of the direct-current bus; or determining the absolute current value of the branch where any photovoltaic string is located according to the first current information, determining the absolute current value of the direct-current bus according to the current information of the direct-current bus, determining the absolute current value of the branch where any pole switch is located according to the second current information, and determining the fault in the photovoltaic power generation in response to determining the absolute current value of the branch where any photovoltaic string is located to be greater than the absolute current value of the direct-current bus and determining the absolute current value of the branch where any pole switch is located to be greater than the absolute current value of the direct-current bus.

7. A fault protection device for a photovoltaic power generation system, the photovoltaic power generation system comprising a power conversion unit and N photovoltaic strings, where N is an integer greater than or equal to 3, the fault protection device comprising:

positive connection terminals and negative connection terminals, the positive connection terminals and the negative connection terminals being adapted to connect to the N photovoltaic strings; a multi-pole linked switch, each pole switch in the multi-pole linked switch having a first terminal connected to one of positive connection terminals or negative connection terminals and a second terminal adapted to be connected to a positive input terminal or a negative input terminal of the power conversion unit; and a control portion configured to control, in response to detecting a fault in the photovoltaic power generation system, a switch tube in the power conversion unit to short-circuit a positive input terminal and a negative input terminal of the power conversion unit to control the multi-pole linked switch to be disconnected, such that at most three of the N photovoltaic strings are connected in parallel, wherein the control portion is further configured to, subsequent to short-circuiting the positive input terminal and the negative input terminal of the power conversion unit:

obtain at least one of a current value of a branch where each photovoltaic string is located, a current value of a branch where each pole switch is located, and a current value of a direct-current bus; and control, in response to determining a power generation current of the photovoltaic power generation system to be smaller than a first predetermined value, the multi-pole linked switch to be disconnected according to the at least one of the current value of the branch where each photovoltaic string is located, the current value of the branch where each pole switch is located, and the current value of the direct-current bus.

8. The fault protection device according to claim 7, wherein:

each of the positive connection terminals is adapted to connect at most three photovoltaic strings; and/or each of the negative connection terminals is adapted to connect at most three photovoltaic strings.

9. The fault protection device according to claim 8, wherein a plurality of photovoltaic strings adapted to be connected by one positive connection terminal have respective negative electrodes connected to at least two negative connection terminals.

10. The fault protection device according to claim 7, wherein when any positive connection terminal is adapted to connect at least four photovoltaic strings, at least two negative connection terminals are adapted to connect negative electrodes of the at least four photovoltaic strings, and each of the at least two negative connection terminals is adapted to connect at most three of the at least four photovoltaic strings; or when any negative connection terminal is adapted to connect at least four photovoltaic strings, at least two positive connection terminals are adapted to connect positive electrodes of the at least four photovoltaic strings, and each of the at least two positive connection terminals is adapted to connect to at most three of the at least four photovoltaic strings.

11. The fault protection device according to claim 7, further comprising:

a parameter detection portion configured to detect at least one of a parameter value of a branch where each photovoltaic string is located, a parameter value of a branch where each pole switch is located, and a parameter value of a direct-current bus, such that the control portion detects the fault in the photovoltaic power generation system according to the at least one of the parameter value of the branch where each photovoltaic string is located, the parameter value of the branch where each pole switch is located, and the parameter value of the direct-current bus.

12. The fault protection device according to claim 11, wherein the parameter value comprises one or more of a voltage, a current value, a temperature, and a power.

13. The fault protection device according to claim 11, wherein:

the parameter detection portion comprises at least one of a first current sensor and a second current sensor, wherein the first current sensor is configured to detect first current information of a branch where any photovoltaic string is located and transmit the first current information to the control portion; and wherein the second current sensor is configured to detect second current information of a branch where any pole switch is located and transmit the second current information to the control portion.

14. The fault protection device according to claim 13, wherein the control portion is further configured to:

detect the fault in the photovoltaic power generation system in response to determining a current direction of the branch where the photovoltaic string is located to be opposite to a predetermined direction according to the first current information, or detect the fault in the photovoltaic power generation system in response to determining a current direction of the branch where the pole switch is located to be opposite to the predetermined direction according to the second current information; or detect the fault in the photovoltaic power generation system in response to determining the current direction of the branch where the photovoltaic string is located to be opposite to the predetermined direction according to the first current information and determining the current direction of the branch where the pole switch is located to be opposite to the predetermined direction according to the second current information; or detect the fault in the photovoltaic power generation system in response to determining an absolute current value of the branch where the photovoltaic string is located to be greater than a first predetermined current threshold according to the first current information; or detect the fault in the photovoltaic power generation system in response to determining an absolute current value of the branch where the pole switch is located to be greater than a second predetermined current threshold according to the second current information; or detect the fault in the photovoltaic power generation system in response to determining the absolute current value of the branch where the photovoltaic string is located to be greater than the first predetermined current threshold according to the first current information and determining the absolute current value of the branch where the pole switch is located to be greater than the second predetermined current threshold according to the second current information.

15. The fault protection device according to claim 13, wherein the parameter detection portion further comprises a first voltage sensor configured to detect a voltage of the direct-current bus and transmit the voltage of the direct-current bus to the control portion.

16. The fault protection device according to claim 15, wherein the control portion is further configured to:

detect the fault in the photovoltaic power generation system when the voltage of the direct-current bus is smaller than a first predetermined voltage threshold; or detect the fault in the photovoltaic power generation system in response to determining an absolute current value of the branch where the photovoltaic string is located to be greater than a first predetermined current threshold and determining the voltage of the direct-current bus to be smaller than a first predetermined voltage threshold; or detect the fault in the photovoltaic power generation system in response to determining an absolute current value of the branch where the pole switch is located to be greater than a second predetermined current threshold and determining the voltage of the direct-current bus to be smaller than the first predetermined voltage threshold.

17. The fault protection device according to claim 13, wherein the parameter detection portion further comprises a third current sensor configured to detect current information of the direct-current bus and transmit the current information of the direct-current bus to the control portion.

18. The fault protection device according to claim 17, wherein the control portion is further configured to:

determine an absolute current value of a branch where any photovoltaic string is located according to the first current information, determine an absolute current value of the direct-current bus according to the current information of the direct-current bus, and detect the fault in the photovoltaic power generation system in response to determining the absolute current value of the branch where any photovoltaic string is located to be greater than the absolute current value of the direct-current bus; or determine an absolute current value of a branch where any pole switch is located according to the second current information, determine the absolute current value of the direct-current bus according to the current information of the direct-current bus, and detect the fault in the photovoltaic power generation system in response to determining the absolute current value of the branch where any pole switch is located to be greater than the absolute current value of the direct-current bus; or determine the absolute current value of the branch where any photovoltaic string is located according to the first current information, determine the absolute current value of the direct-current bus according to the current information of the direct-current bus, determine the absolute current value of the branch where any pole switch is located according to the second current information, and detect the fault in the photovoltaic power generation system in response to determining the absolute current value of the branch where any photovoltaic string is located to be greater than the absolute current value of the direct-current bus and determining the absolute current value of the branch where any pole switch is located to be greater than the absolute current value of the direct-current bus.

19. A combiner box, comprising:

the fault protection device according to claim 7, wherein the fault protection device is configured to, in response to the fault in the photovoltaic power generation system, short-circuit a positive input terminal and a negative input terminal of a power conversion unit and disconnect N photovoltaic strings and the power conversion unit, such that at most three of the N photovoltaic strings are connected in parallel.

20. An inverter, comprising:

the fault protection device according to claim 7; and a power conversion unit comprising a DC/AC converter, wherein the power conversion unit is configured to convert a direct-current outputted by the N photovoltaic strings and output an alternating current through the DC/AC converter, and wherein the fault protection device is configured to, in response to a fault in the photovoltaic power generation system, short-circuit a positive input terminal and a negative input terminal of the power conversion unit and disconnect the N photovoltaic strings and the power conversion unit, such that at most three of the N photovoltaic strings are connected in parallel.

21. A photovoltaic power generation system, comprising the fault protection device according to claim 7.

22. The photovoltaic power generation system according to claim 21, wherein when the fault protection device comprises a plurality of multi-pole linked switches, each of the plurality of multi-pole linked switches is connected in parallel to a positive input terminal and a negative input terminal of the power conversion unit, wherein the control portion is further configured to determine a fault type of the photovoltaic power generation system and control part or all of the plurality of multi-pole linked switches to be disconnected according to the fault type of the photovoltaic power generation system.

23. The photovoltaic power generation system according to claim 22, wherein the control portion is further configured to control a multi-pole linked switch of the plurality of multi-pole linked switches that corresponds to a reverse connection branch to be disconnected when the fault type of the photovoltaic power generation system is a reverse connection fault; or the control portion is further configured to control all of the plurality of multi-pole linked switches to be disconnected when the fault type of the photovoltaic power generation system is a short-circuit fault.

24. The photovoltaic power generation system of claim 21, wherein the power conversion unit comprises at least one of a DC/DC converter and a DC/AC converter.

25. The photovoltaic power generation system according to claim 24, wherein: when the power conversion unit comprises the DC/DC converter and the DC/AC converter:

a positive input terminal of the DC/DC converter serves as a positive input terminal of the power conversion unit;

a negative input terminal of the DC/DC converter serves as a negative input terminal of the power conversion unit; and an output terminal of the DC/DC converter is connected to an input terminal of the DC/AC converter.

26. The photovoltaic power generation system according to claim 25, wherein: when the fault protection device comprises a plurality of multi-pole linked switches, the power conversion unit comprises a plurality of DC/DC converters, wherein:

an input terminal of each of the plurality of DC/DC converters is connected to a corresponding one of the plurality of multi-pole linked switches; and respective output terminals of the plurality of DC/DC converters are connected in parallel to input terminals of the DC/AC converter.

* * * * *